(12) United States Patent
Van Os et al.

(10) Patent No.: US 8,776,671 B2
(45) Date of Patent: Jul. 15, 2014

(54) COFFEE BEAN PACKAGING CARTRIDGE AND COFFEE BEVERAGE SYSTEM INCLUDING THE SAME

(75) Inventors: Ivo Van Os, Utrecht (NL); Gerbrand Kristiaan de Graaff, Hillegom (NL); Christiaan Johannes Maria Moorman, Moergestel (NL); Charles Kevin Dillon, Bottisham (GB)

(73) Assignees: Koninklijke Douwe Egberts B.V., Utrecht (NL); Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 13/587,582

(22) Filed: Aug. 16, 2012

(65) Prior Publication Data
US 2013/0115342 A1    May 9, 2013

Related U.S. Application Data

(63) Continuation of application No. PCT/NL2011/050110, filed on Feb. 17, 2011.

(30) Foreign Application Priority Data

| Feb. 17, 2010 | (WO) | ................ PCT/NL2010/050077 |
| Feb. 22, 2010 | (NL) | ..................................... 2004274 |
| Aug. 17, 2010 | (NL) | ..................................... 2005238 |
| Aug. 26, 2010 | (NL) | ..................................... 2005278 |
| Aug. 26, 2010 | (NL) | ..................................... 2005280 |

(51) Int. Cl.
*A47J 31/00* (2006.01)
*A47J 31/42* (2006.01)

(52) U.S. Cl.
USPC ........................................... 99/286; 99/289 R

(58) Field of Classification Search
USPC ......... 99/286, 289 R, 295; 222/133, 134, 282
See application file for complete search history.

(56) References Cited

U.S. PATENT DOCUMENTS

| 4,555,984 A | 12/1985 | Yamashita |
| 4,936,515 A | 6/1990 | Poag |
| 5,267,507 A | 12/1993 | Enomoto |

(Continued)

FOREIGN PATENT DOCUMENTS

| CN | 1413340 | 4/2003 |
| CN | 2684712 | 3/2005 |

(Continued)

OTHER PUBLICATIONS

International Search Report for PCT/NL2011/050110, mailing date Apr. 19, 2011, 3 pages.

(Continued)

*Primary Examiner* — Reginald L Alexander
(74) *Attorney, Agent, or Firm* — Foley & Lardner LLP

(57) ABSTRACT

A coffee beverage system is described including a first coffee bean packaging cartridge, a second coffee bean cartridge and a coffee brewing apparatus. After a first predetermined number of servings of coffee, transportation component of the first cartridge for transporting coffee beans of the first cartridge to a metering chamber of the system are disabled. The transportation component of the second coffee bean cartridge are not disabled or only disabled after a second predetermined number of servings of coffee which is larger than the first predetermined number of servings of coffee.

62 Claims, 30 Drawing Sheets

(56) References Cited

U.S. PATENT DOCUMENTS

| | | | |
|---|---|---|---|
| 5,386,944 A | 2/1995 | Knepler | |
| 5,632,449 A | 5/1997 | Sandolo | |
| 6,339,985 B1 | 1/2002 | Whitney | |
| 7,013,796 B2 * | 3/2006 | Smit | 99/286 |
| 8,047,124 B2 * | 11/2011 | Lin | 99/286 |
| 8,439,235 B2 * | 5/2013 | Mih et al. | 222/410 |
| 2002/0092941 A1 | 7/2002 | Henderson et al. | |
| 2002/0153438 A1 | 10/2002 | Glucksman et al. | |
| 2009/0127363 A1 * | 5/2009 | Malykke | 241/248 |
| 2010/0080886 A1 | 4/2010 | Hourizadeh | |
| 2010/0308141 A1 | 12/2010 | Bich | |

FOREIGN PATENT DOCUMENTS

| | | |
|---|---|---|
| DE | 29 26 389 | 1/1981 |
| DE | 203 00 928 | 5/2004 |
| DE | 203 00 933 | 5/2004 |
| DE | 10 2007 008898 | 8/2008 |
| DE | 1020070 08 900 | 10/2008 |
| EP | 0 452 214 | 10/1991 |
| EP | 0 605 750 A1 | 7/1994 |
| EP | 0 766 943 A1 | 4/1997 |
| EP | 0 804 894 | 11/1997 |
| EP | 1 700 549 | 9/2006 |
| EP | 2 067 421 | 6/2009 |
| FR | 2565088 | 12/1985 |
| GB | 2 447 678 | 9/2008 |
| WO | WO-00/27262 | 10/2000 |
| WO | WO-01/048711 | 7/2001 |
| WO | WO-2010/095937 | 8/2010 |

OTHER PUBLICATIONS

International Search Report for PCT/NL2010/050077, mailing date Aug. 5, 2010, 6 pages.

* cited by examiner

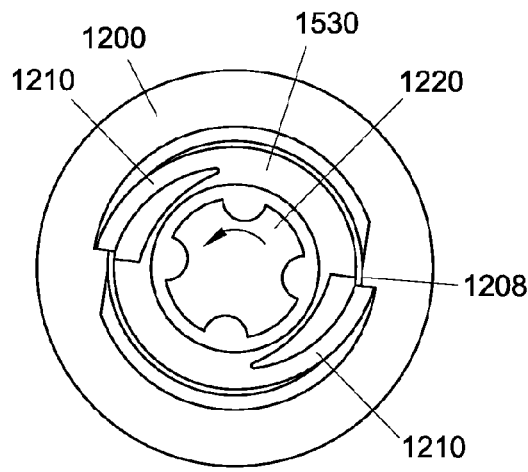
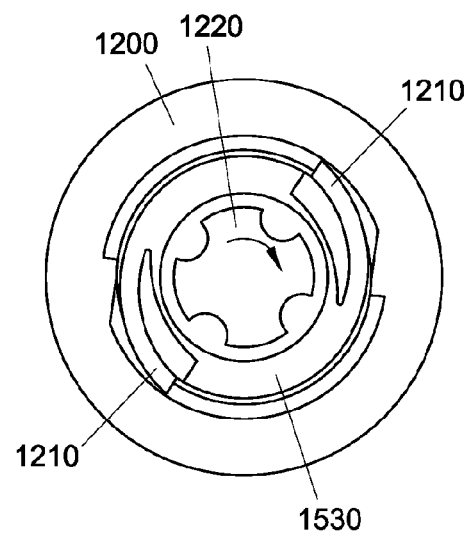
Fig. 13A    Fig. 13B
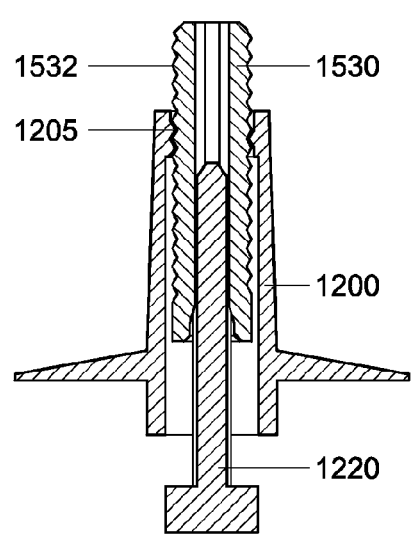
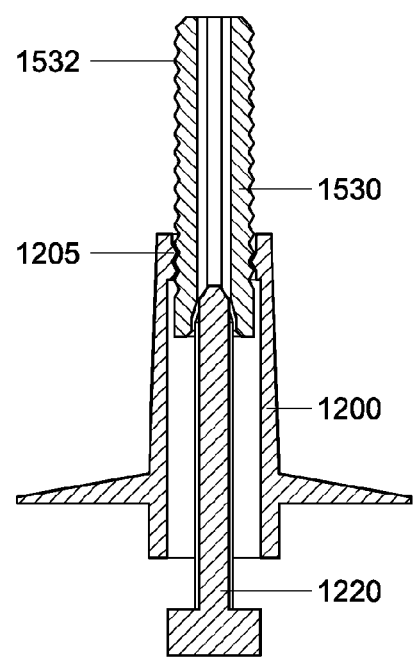
Fig. 13C    Fig. 13D

COFFEE BEAN PACKAGING CARTRIDGE AND COFFEE BEVERAGE SYSTEM INCLUDING THE SAME

CROSS-REFERENCE TO RELATED APPLICATIONS

The present application is a continuation of International Patent Application Serial No. PCT/NL2011/050110 filed on Feb. 17, 2011 which claims priority to International Patent Application Serial No. PCT/NL2010/050077 filed on Feb. 17, 2010 and Netherlands Application Nos. NL2004274 filed on Feb. 22, 2010, NL2005238 filed on Aug. 17, 2010, NL2005278 filed on Aug. 26, 2010, and NL2005280 filed on Aug. 26, 2010—the full disclosures of all applications listed above are hereby incorporated herein by reference in their entireties.

BACKGROUND

The invention relates to a coffee beverage system including a coffee bean packaging cartridge. In particular the invention relates to a system for preparing coffee wherein the coffee bean packaging cartridge is arranged for holding and supplying multiple servings of coffee beans and wherein the system comprises a grinder for grinding the beans and a brewing device for brewing coffee on the basis of grinded coffee obtained by means of the grinder.

It is known to pack roasted coffee beans in containers that can be connected to coffee brewing apparatus that include a grinding mechanism. For such systems to be efficient the containers have often been designed to hold between 1 kg and 3 kg of coffee beans.

The patent application EP 0 804 894 A2 discloses such a coffee dispensing and brewing apparatus that comprises components for dispensing a predetermined amount of coffee to a brew basket, the components including a hopper (container) for holding a supply of coffee beans and an auger device communicating with the hopper for portioning coffee beans in a predetermined amount to a coffee grinder. The apparatus further includes a brew basket holding assembly for releasably holding the brew basket in a region adjacent a passageway to the grinder and a hot water making and delivery system for distributing a predetermined volume of hot water from a hot water holding tank to the region during a brewing cycle. The grinder motor has a right angle power transmission that couples the motor to the grinder with the motor being located below the grinder and adjacent a vertical side of the holding tank.

For such existing coffee beverage systems, the coffee supplier wishes that it should be highly likely, that the cartridge cooperating with the coffee brewing apparatus marketed by the supplier and on which her name is printed, carries the coffee beans of the supplier. Furthermore, it would be advantageous for the supplier to be able to supply coffee beans under another label for refilling the cartridge cooperating with the coffee brewing apparatus.

Accordingly, it is an object of the present invention to provide a system for preparing coffee beverages of the above referred to kind, which enables both these options. In a more general sense it is thereby an object of the invention to overcome or ameliorate at least one of the disadvantages of the prior art. It is also an object of the present invention to provide alternative structures which may be less cumbersome in assembly and operation and which moreover can be made relatively inexpensively.

Unless stated otherwise, in the description and claims coffee beans are understood to be burnt/roasted coffee beans. Coffee beans in the description and claims may be understood to cover also fragmented coffee beans, that is, coffee bean fragments, which coffee bean fragments are still to be grinded for extracting desired coffee beverage. The coffee beans are for instance broken, before they are packaged. In an embodiment, at least a part of the coffee beans in the coffee bean package is divided into about thirty or less, in particular about fifteen or less, more particularly about ten fragments or less. One coffee bean fragment then comprises for instance one-thirtieth part, in particular one-fifteenth part, more particularly one-tenth part or more of a coffee bean. For instance, the coffee bean fragments comprise a half or a quarter of a coffee bean. An advantage of the use of coffee bean fragments compared with whole coffee beans can be that coffee bean fragments can be supplied to the grinder relatively simply and/or that the package can be closed off relatively simply. This is because the coffee bean fragments are relatively small and hence can slide relatively easily through openings in the package and the apparatus and/or will block the coffee bean outlet and/or closing means less easily. As the coffee beans may beforehand have been divided into fragments, though not grinded, in the meantime comparatively more bean surface can come into contact with any ambient air than would be case with whole coffee beans. On the other hand, less bean surface will come into contact with air than would be the case with grinded coffee, so that coffee bean fragments can be preserved better than grinded coffee beans. Only just before preparation of the coffee beverage are the coffee bean fragments grinded for obtaining coffee beverage. In this description, therefore, coffee bean may also be understood to include a fragmented coffee bean, that is, which is still to be grinded for preparing the desired coffee beverage.

According to the invention, a system and methods are provided according to the independent claims. Favorable embodiments are defined by the dependent claims. According to one aspect of the invention there is provided a coffee beverage system, including a first coffee bean packaging cartridge and a coffee brewing apparatus wherein the first coffee bean packaging cartridge can be removable connected to the coffee brewing apparatus. The first coffee bean packaging cartridge, which preferably is non refillable with coffee beans, is arranged for holding and supplying multiple servings of coffee beans. It includes a container comprising an interior volume and at least one exit opening defining a coffee bean outlet, the interior volume holding coffee beans and transportation means adapted for enabling transportation of the coffee beans from the interior volume towards the exit opening of the first cartridge. The coffee apparatus comprises an entrance opening for receiving coffee beans which are transported with the aid of the transportation means towards the exit opening of the first cartridge, a grinder for grinding coffee beans which have entered the coffee apparatus via the entrance opening and a brewing device for brewing coffee on the basis of grinded coffee obtained by means of the grinder. The transportation means of the first cartridge comprise a part which is movable relative to a main body of the first cartridge for transporting the coffee beans towards the exit opening of the first cartridge upon driving of said transportation means. The coffee brewing apparatus is provided with a motor and a vertically extending drive shaft wherein said drive shaft is releasable connected with the transportation means of the first cartridge for driving and thereby moving the transportation means of the first cartridge upon rotation of the drive shaft by means of the motor means for transporting the coffee beans towards the exit opening of the first cartridge. The first cartridge is arranged such that, if the drive shaft is connected with the transportation means, after a first predetermined number of revolutions of the drive shaft the transportation means of the first cartridge is automatically disabled for transporting the coffee beans towards the exit opening. The system is further provided with a second coffee bean cartridge which can also be removable connected to the coffee brewing apparatus. The second coffee bean cartridge, which preferably is refillable with coffee beans, is arranged for being filled with and holding and supplying multiple servings of coffee beans. The second coffee beans cartridge includes a container comprising an interior volume and at least one exit opening defining a coffee bean outlet, the interior volume being arranged for holding coffee beans and transportation means adapted for enabling transportation of the coffee beans from the interior volume towards the exit opening of the second cartridge. The second cartridge is adapted to the coffee apparatus so that, if the second cartridge is connected to the coffee apparatus, coffee beans which are transported with the aid of the transportation means of the second cartridge towards the exit opening of the second cartridge can be received by the coffee apparatus via the entrance opening for preparing coffee. The second cartridge is arranged such that the transportation means of the second cartridge will not be disabled upon a predetermined number of revolutions of the drive shaft or will only be disabled after a second predetermined number of revolutions of the drive shaft wherein the second predetermined number of revolutions is greater than the first predetermined number of revolutions.

With the coffee beverage system according to the present invention, the first coffee bean packaging cartridge, which may be disposable, may comprise the coffee beans of the supplier. The first coffee bean packaging cartridge may be designed to be non-refillable or be refillable only a limited number of times. By automatically disabling the transportation means of the first cartridge for transporting the coffee beans towards the exit opening thereof, the first coffee bean packaging cartridge is made useless after a predetermined number of coffee servings, which preferably corresponds to the amount of coffee beans present in the interior volume of the first coffee bean packaging cartridge or is slightly superior. After the predetermined number of coffee servings, the first coffee bean packaging cartridge should be replaced with another coffee bean packaging cartridge. In this way, there is a strong guarantee that the first coffee bean packaging cartridge comprises the coffee beans of the supplier. A further possible advantage may be that the supplier can give a guarantee that there are no or very few stones in the coffee bean packaging cartridge. Often stones with a size between a millimeter and a centimeter are present in bags filled with coffee beans. If coffee beans of such bags are used, the stones therein may cause damages to the grinder, resulting in tear thereof, the risk of a broken grinder and a deterioration of the coffee quality. This may be avoided by means of an X-ray destoner in the production line. So, the supplier providing such "destoned" coffee beans is enabled to give a guarantee that there are no or very few stones in the cartridge in case that the cartridge is non-refillable.

The second coffee bean cartridge may comprise the coffee beans of the supplier marketed under another label. It may be designed to be refillable, either a considerable number of times or an unlimited number of times.

When the first cartridge is mounted to the coffee brewing apparatus of the system, the system may be arranged for rotating the vertically extending drive shaft with the motor means thereby driving and moving the transportation means of the first cartridge upon for transporting the coffee beans towards the exit opening of the first cartridge, grinding coffee beans which have entered the coffee apparatus via the entrance opening thereof and brewing coffee on the basis of grinded coffee. The first cartridge may be arranged such that, if the drive shaft is connected with the transportation means, after a first predetermined number of revolutions of the drive shaft in a direction other than, or other than used for driving the transportations means of the first cartridge the transportation means of the first cartridge is automatically disabled for transporting the coffee beans towards the exit opening. The drive shaft may be rotated in the in a direction other than, or other than used for driving the transportations means of the first cartridge each time after transporting the coffee beans for a serving of coffee towards the exit opening of the first cartridge.

Alternatively, the first cartridge may be arranged such that, if the drive shaft is connected with the transportation means after a first predetermined number of revolutions of the drive shaft for driving the transportations means of the first cartridge the transportation means of the first cartridge is automatically disabled for transporting the coffee beans towards the exit opening.

The system may be arranged for executing the automatic disabling of the transportation means of the first cartridge for transporting the coffee beans towards the exit opening by means of bringing it into a motor stall condition or by means of disengagement of a mechanical connection, so that the rotation of the drive shaft does not result in driving the transmission means or a part of the transmission means.

The movable part of the transportation means of the first cartridge may include a disk element, for example an impellor including a bottom and a plurality of vanes, which rotates upon rotation of the drive shaft. The disk element may include a recess wherein the disk element rotates upon rotation of the drive shaft due to an engagement of drive means with the recess.

According to an embodiment, the drive means comprise the drive shaft and a drive bush, mountable on the drive shaft as well as a nut mountable on the drive bush. The engagement of the drive means and the recess may be by means of an engagement of the nut and a wall of the recess by means of one or more protrusions engaging with one or more corresponding slots. Revolutions of the drive shaft in a direction for driving the transportation means cause the rotation the drive bush and the nut mounted thereto and the corresponding rotation of the disk element, resulting in the transportation of the coffee beans towards the exit opening. Revolutions of the drive shaft in a direction other than, or other than used for driving the transportation means of the first cartridge cause the rotation of the nut with respect the drive bush. Since, the nut is connected to the drive bush by means of screw thread, such revolutions result in nut moving upwards or downwards over the drive bush. After the first predetermined revolutions in the direction other than, or other than used for driving the transportation means the nut has moved so far that it disengages from the wall of the recess and driving the transportation means by means of the drive shaft becomes impossible.

According to an alternative embodiment, the drive means comprise a drive bush mountable on the drive shaft. The engagement between the drive means and the disk element is by means an engagement of the drive bush and the wall of the recess by one or more snap fingers engaging with one or more corresponding slots. Furthermore, the drive bush is engaged with the wall by means of screw thread. In case of revolutions of the drive shaft and thereby the drive bush in the direction of driving the transportation means, the snap finger-slot engagement between the drive bush and the wall of the recess of the disk element results in the rotation of the disk element and the transportation of the coffee beans towards the exit opening of the first cartridge. Rotation of the drive shaft in the direction other than, or other than used for driving the transportation means results in the drive bush going upwards with respect to the disk element so that after the first predetermined number of revolutions of the drive shaft the drive bush disengages from the drive shaft and driving the transportation means by means of the drive shaft becomes impossible.

The transportation means of the second cartridge may comprise a downwardly extending bottom wall such as a funnel of the container for transporting the coffee beans towards the exit opening of the second cartridge under the influence of gravity.

Alternatively or additionally, the transportation means of the second cartridge comprises a part which is movable relative to a main body of the second cartridge for transporting the coffee beans towards the exit opening of the second cartridge upon driving of said transportation means. The transportation means may be releasable connectable with the vertically extending drive shaft of the coffee brewing apparatus. Upon rotation of the drive shaft by means of the motor the transportation means of the cartridge are driven and thereby moved for transporting the coffee beans towards the exit opening of the second cartridge.

The movable part of the transportation means of the second cartridge may include a disk element, which rotates upon rotation of the drive shaft. The disk element may be an impellor including a bottom and a plurality of vanes. It may include a recess wherein the disk element rotates upon rotation of the drive shaft due to an engagement of drive means with a wall of the recess.

The second cartridge may be arranged such that, if the drive shaft is connected with the transportation means, the transportation means will not be disabled upon a predetermined number of revolutions of the drive shaft in a direction other than, or other than used for driving the transportations means of the second cartridge or will only be disabled after a second predetermined number of revolutions of the drive shaft wherein the second predetermined number of revolutions is greater than the first predetermined number of revolutions.

The system may be further provided with a metering chamber for receiving coffee beans which are transported with the aid of the transportation means into the metering chamber. The metering chamber may be arranged for receiving a portion of coffee beans corresponding to a dosed amount of coffee beans which is preferably necessary for preparing a single serving of coffee beverage.

The metering chamber may be divided in a first chamber portion which is part of the first or second cartridge and a second chamber portion which is part of the coffee brewing apparatus. The second chamber portion may comprise a bottom portion which forms a part of the grinder, said bottom portion being arranged in the coffee brewing apparatus for rotating around a first axis extending in a vertical direction. The system may be arranged such that upon activation of the grinder the bottom portion is rotating around the vertical axis for transporting the coffee beans from the metering chamber into the grinder and for grinding the coffee beans.

The division of the metering chamber over the cartridge and the brewing apparatus enables to provide a compact coffee beverage system. The use of a bottom portion of the metering chamber, which is part of the grinder and which rotates for emptying the metering chamber also results in a decreased height of the system compared to the alternative option of providing a separate bottom plate of the metering chamber and a separate grinder.

The coffee bean packaging cartridge may comprise closing means for closing the coffee bean outlet when the coffee bean packaging cartridge is not connected to the coffee brewing apparatus. In this way it is avoided that coffee beans fall out of the coffee bean packaging cartridge when it is not connected to the coffee brewing apparatus.

The closing means may be configured for opening the coffee bean outlet when the coffee bean packaging cartridge is connected to the coffee brewing apparatus.

The closing means may comprise a closure member at the bottom side of the container comprising the coffee bean outlet and a rotatable closing disk having an opening. In order to connect the first and/or second cartridge to the coffee brewing apparatus the opening of the rotatable closing disk may be brought in a position aligned with the coffee bean outlet.

The closure member may comprise a pair of fletching arms and the closure disk may comprise a detent, which in the closed position is caught behind the fletching arms.

The exit opening may be associated with a removable sealing element sealing the interior volume prior to activation of the first and/or cartridge wherein preferably said sealing element prevents gasses to escape from the cartridge. The beverage system may comprise means for disrupting and displacing the sealing element, preferably when the cartridge is connected to the brewing apparatus for the first time. The sealing element may be a sealing membrane.

The coffee brewing apparatus may comprise connection means for the removable connection to the first or second cartridge. The connection means may comprise a recess at an upper side of the coffee brewing apparatus, the recess being surrounded by a side wall and being configured for receiving a corresponding part protruding from a lower side of the coffee bean packaging cartridge. The side wall may protrude from the upper side of the coffee brewing apparatus and be covered by a housing.

The coffee brewing apparatus may comprise control means for rotating the vertically extending drive shaft with the motor means thereby driving and moving the transportation means for transporting the coffee beans towards the exit opening of the first and/or second cartridge, grinding coffee beans which have entered the coffee apparatus via the entrance opening thereof and brewing coffee based on the grinded coffee and heated water heated by a heating device of the coffee brewing apparatus.

The control means may be furthermore configured for rotating the drive shaft with the motor means in a direction other than, or other than used for driving the transportations means of the first and/or second cartridge, after the filling of the metering chamber.

The control means may be configured such that, in use, the transportation means is driven for filling the metering chamber with coffee beans and that after completion thereof the grinding device is activated for emptying the metering chamber and for grinding coffee beans which were collected in the metering chamber during the first step. The transportation means may be driven longer than is required for filling the metering chamber with coffee beans and/or the grinding device may be activated longer than is required for emptying or at least substantially completely emptying the metering chamber and for grinding all the coffee beans which were collected in the metering chamber during the filling step.

Further advantageous aspects of the invention will become clear from the appended description of preferred embodiments.

BRIEF DESCRIPTION OF THE DRAWINGS

The invention will now be described in reference to the accompanying drawings, in which:

FIG. 13A-13D serve to explain the functionality of the elements shown in FIGS. 12A-12C.

DESCRIPTION OF EXEMPLARY EMBODIMENTS

Figure 1:
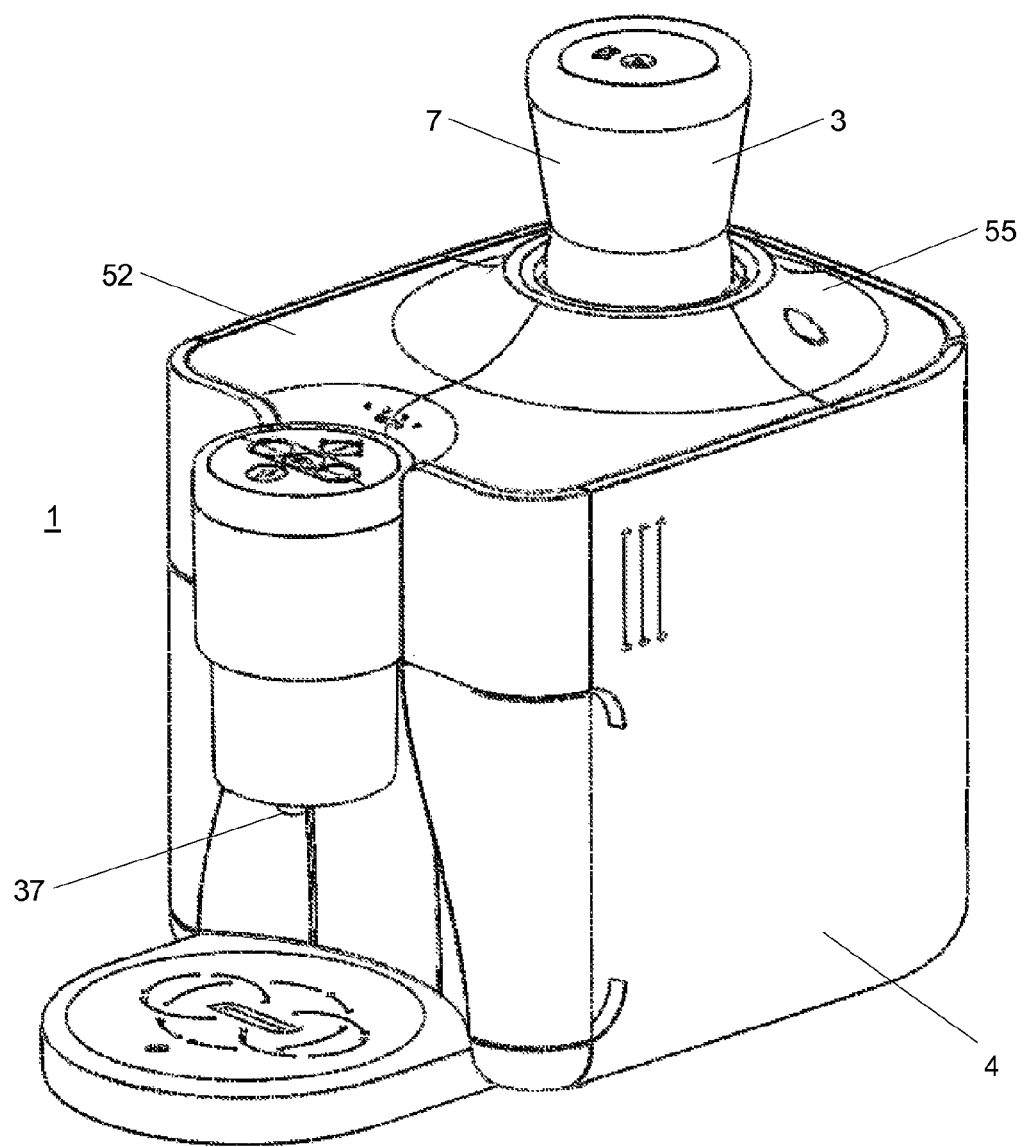
FIG. 1 shows a perspective view of an embodiment of the coffee brewing system according to the present invention with a coffee bean cartridge mounted to the coffee brewing apparatus.
Figure 2:
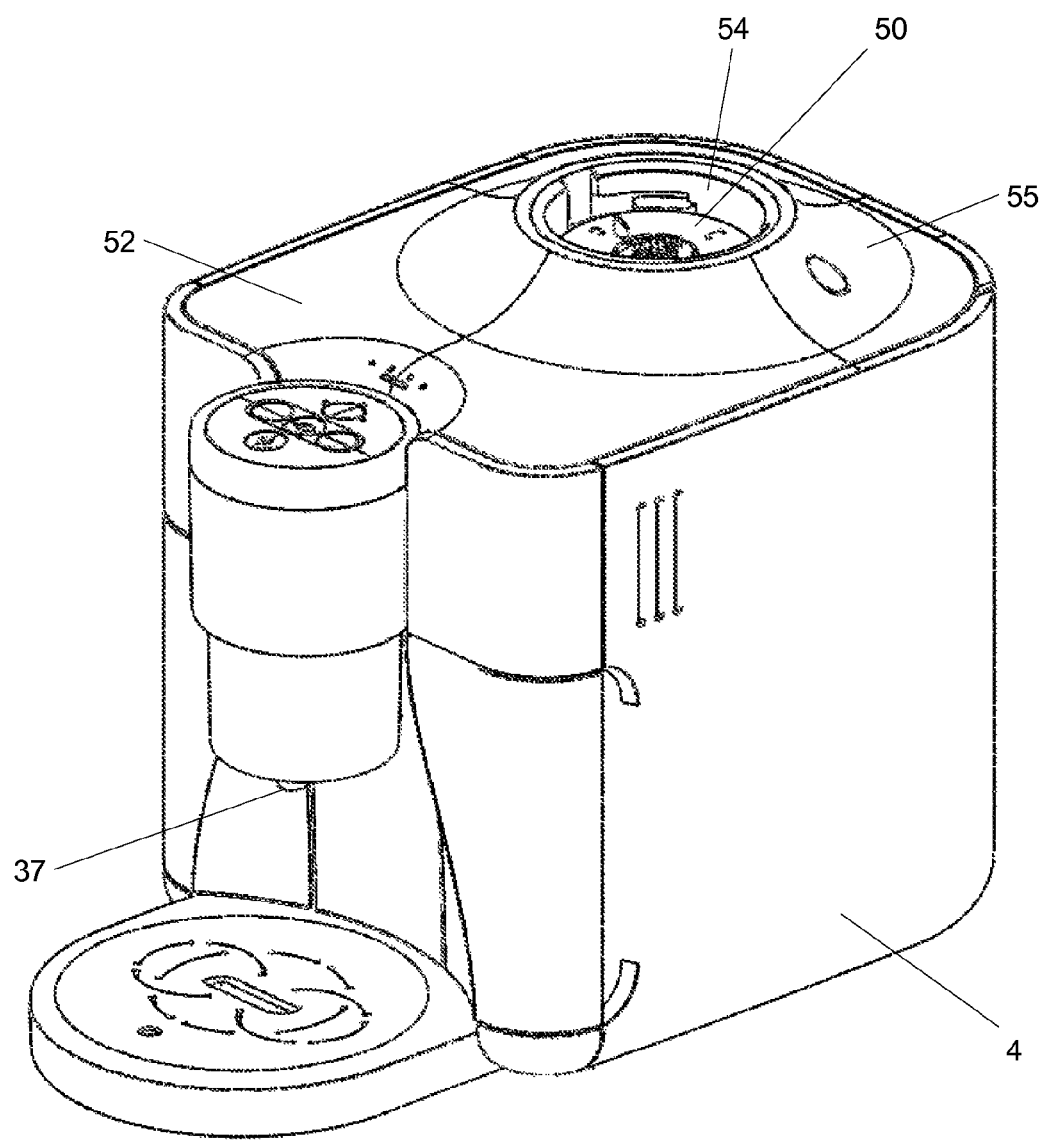
FIG. 2 shows a perspective view of an embodiment of the coffee brewing system according to the present invention without a coffee bean cartridge mounted to the coffee brewing apparatus.

In FIG. 1 a system 1 for preparing coffee beverages is shown. The system 1 includes a coffee bean cartridge 3 and a coffee brewing apparatus 4. The coffee bean cartridge may be of a first type, i.e. a coffee bean packaging cartridge that is not refillable or may only be refillable a very limited number of times or of a second type, i.e. a coffee bean cartridge that is either refillable a number of times higher than the number of times that the coffee bean cartridge of the first type may be refilled or it is refillable an unlimited number of times. The coffee bean cartridge 3 is removably connected to the coffee brewing apparatus 4. FIG. 2 shows the coffee brewing apparatus without the coffee bean cartridge 3 mounted thereon. Both, the coffee bean packaging cartridge 3 of the first and second type comprise a container 7 having an interior volume for containing coffee beans and an exit opening. These coffee beans are roasted and include generally roasted half beans. Preferably, the coffee beans cartridge 3 is closed airtight and/or under vacuum before it is placed on the coffee brewing apparatus 4. Also the coffee bean cartridge 3 can be in the form of a disposable packaging, so that it can be thrown away after it has been emptied.

Figure 3A:
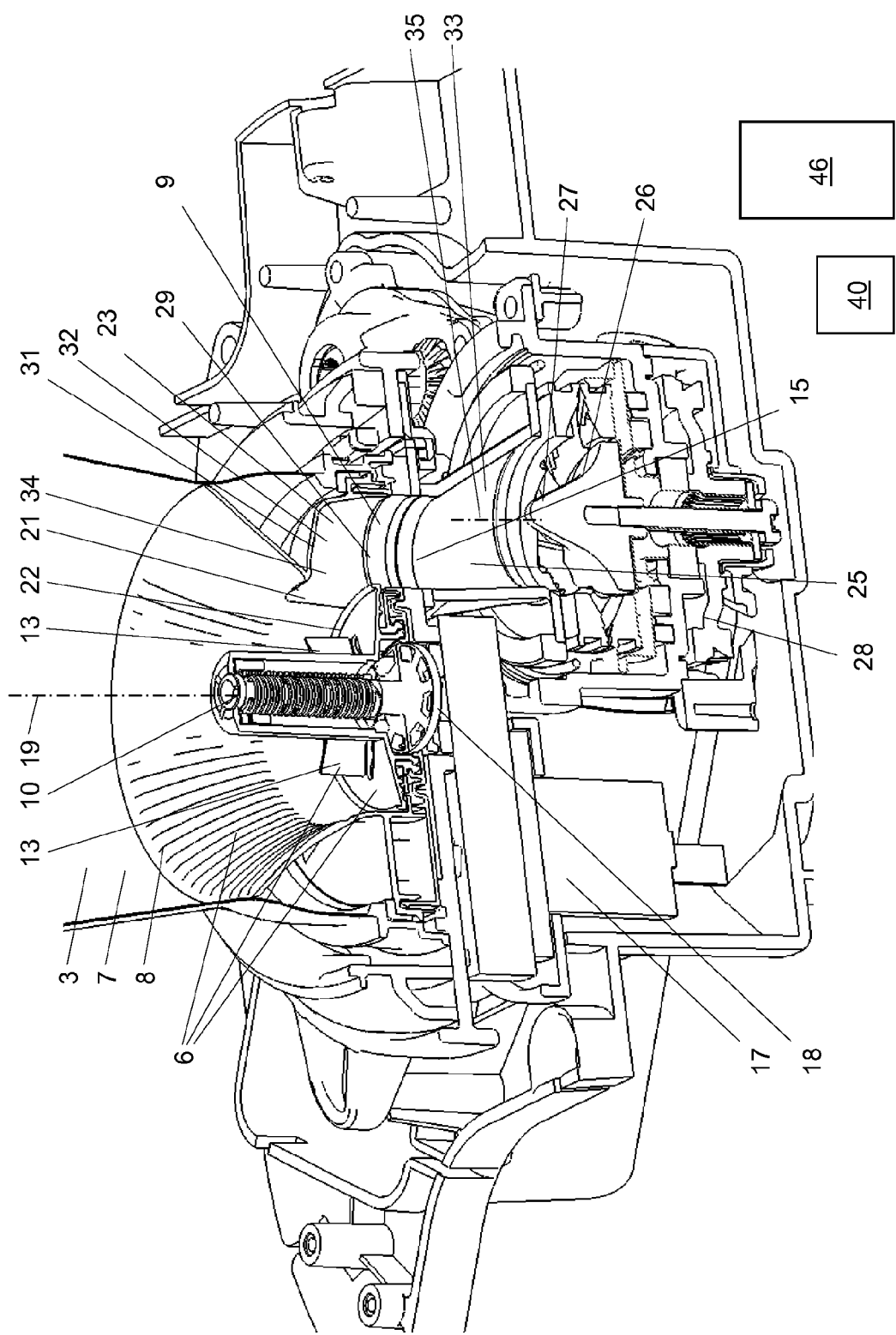
FIG. 3A shows a cross sectional view of a part of the coffee brewing system according to FIG. 1 in perspective when using a coffee bean packaging cartridge of a first type with anti-refill mechanism.
Figure 3B:
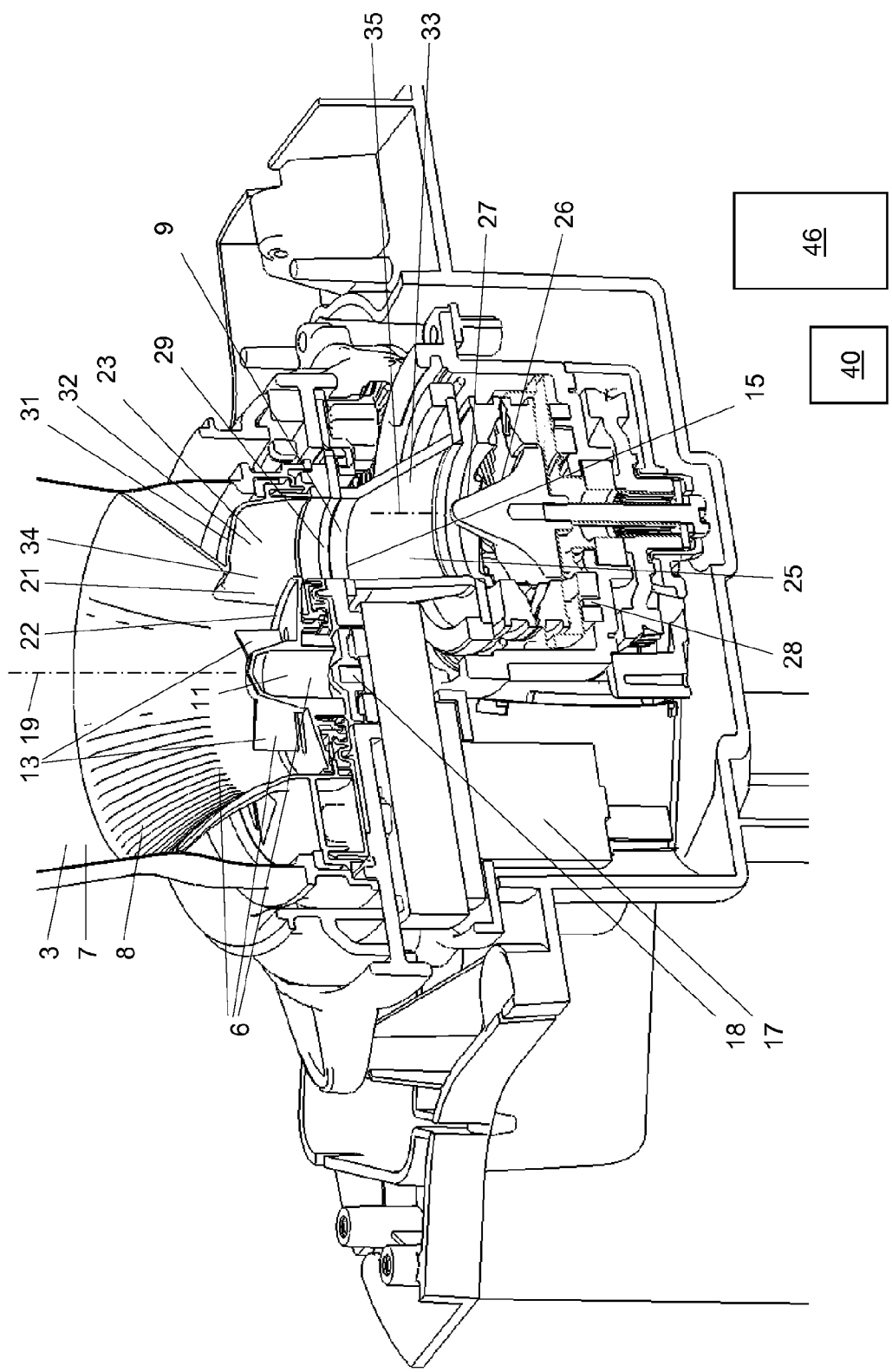
FIG. 3B shows a cross sectional view of a part of the coffee brewing system according to FIG. 1 in perspective when using a coffee bean cartridge of a second type without anti-refill mechanism.

Referring now to FIGS. 3A and 3B, the coffee beverage system 1 will be described in more detail. FIG. 3A shows a cartridge of a first type with an anti-refill mechanism, to be described in more detail herein after, also referred to in this description as the first cartridge or the first coffee bean packaging cartridge. FIG. 3B shows a cartridge of a second type without anti-refill mechanism, also referred to in this description as the second cartridge or the second coffee bean cartridge Most features of the first and second cartridges are the same, except for the impellor and the driving means thereof, as will be discussed herein after. In both cases the cartridge comprises transportation means 6 for enabling transportation of the coffee beans from the interior volume of the container 7 (only partially visible in FIGS. 3 and 3B) towards the exit opening 29 of the cartridge 3. The coffee apparatus is provided with an entrance opening 9 for receiving coffee beans which are transported by means of the transportation means towards the exit opening 29. The exit opening 29 extends above the coffee bean entrance opening 9 of the coffee brewing apparatus 4.

A lower part of the container 7 comprises a funnel 8 which forms part of the transportation means 6. The beans of the coffee bean packaging cartridge 3 are guided by means of the funnel 8 towards the exit opening 29 of the cartridge. In case of the first cartridge with anti-refill mechanism the transportation means comprise a disk element (impellor) of a first type 10, also referred to in this description as first impellor, having several flexible vanes 13. In case of the cartridge without anti-refill mechanism the transportation means comprise a disk element (impellor) of a second type 11, also referred to in this description as second impellor, which again comprises several flexible vanes 13. The reason for using different impellors lies in the need to use different drive means for driving the impellor in case of anti-refill and without anti-refill mechanism, as will be discussed herein after. Upon driving the movable part (impellor) of the transportation means, in this example by rotating the impellor around a second axes 19 extending in a vertical direction, the coffee beans are transported towards the exit opening 29.

The system further comprises a metering chamber 15. The metering chamber is divided in a first chamber portion 23 which is part of the cartridge and a second chamber portion 25 which is part of the coffee brewing apparatus. The first chamber portion is located above the second chamber portion. The first chamber portion comprises the exit opening 29 of the cartridge and the second chamber portion comprises the entrance opening of the coffee apparatus. The first chamber portion is provided with an upstanding side wall 32 comprising an inlet opening 21 for letting pass coffee beans into the metering chamber which coffee beans are transported by means of the transportations means towards the exit opening of the cartridge. The transportation means are thus configured for transporting the coffee beans towards and into the metering chamber 15 of the coffee beverage system 1 upon driving of the transportation means. This driving is performed by means of a first motor 17 of the coffee apparatus, driving a drive shaft 18 of the coffee apparatus extending along a vertical axis 19. Due to the driving, the impellor 10/11 comprising the vanes 13 rotates around the second vertical axis 19. In this way, the coffee beans are driven in a horizontal direction to the inlet opening 21 of the metering chamber 15. The cartridge comprises a small trickle through edge 22 to avoid the uncontrolled entering of coffee beans in the metering chamber 15 when the impellor 10/11 is not rotating. The metering chamber 15 comprises the first chamber portion 23 in the cartridge 3 and the second chamber portion 25 in the brewing apparatus 4. The bottom 26 of the metering chamber at least comprises a bottom portion 27 which is part of a grinder 28 for grinding coffee beans. The coffee beans leave the fist chamber portion 23 and thereby the cartridge 3 via the exit opening 29 of the cartridge 3 and enter the second chamber portion 25 and thereby the coffee brewing apparatus via the entrance opening 9. The size of the metering chamber is limited by a top wall 31, the bottom 26 and an upstanding side wall 32. The upstanding side wall 32 comprises the upstanding side wall 34 of the first chamber portion and an upstanding side wall 33 of the second chamber portion. The second chamber portion comprises about 100-X % of the volume of the metering chamber and the first chamber portion comprises about X % of the volume of the metering chamber wherein X is in the range of 2-50, preferably in the range of 4-30, more preferably in the range of 6-15.

Figure 3C:
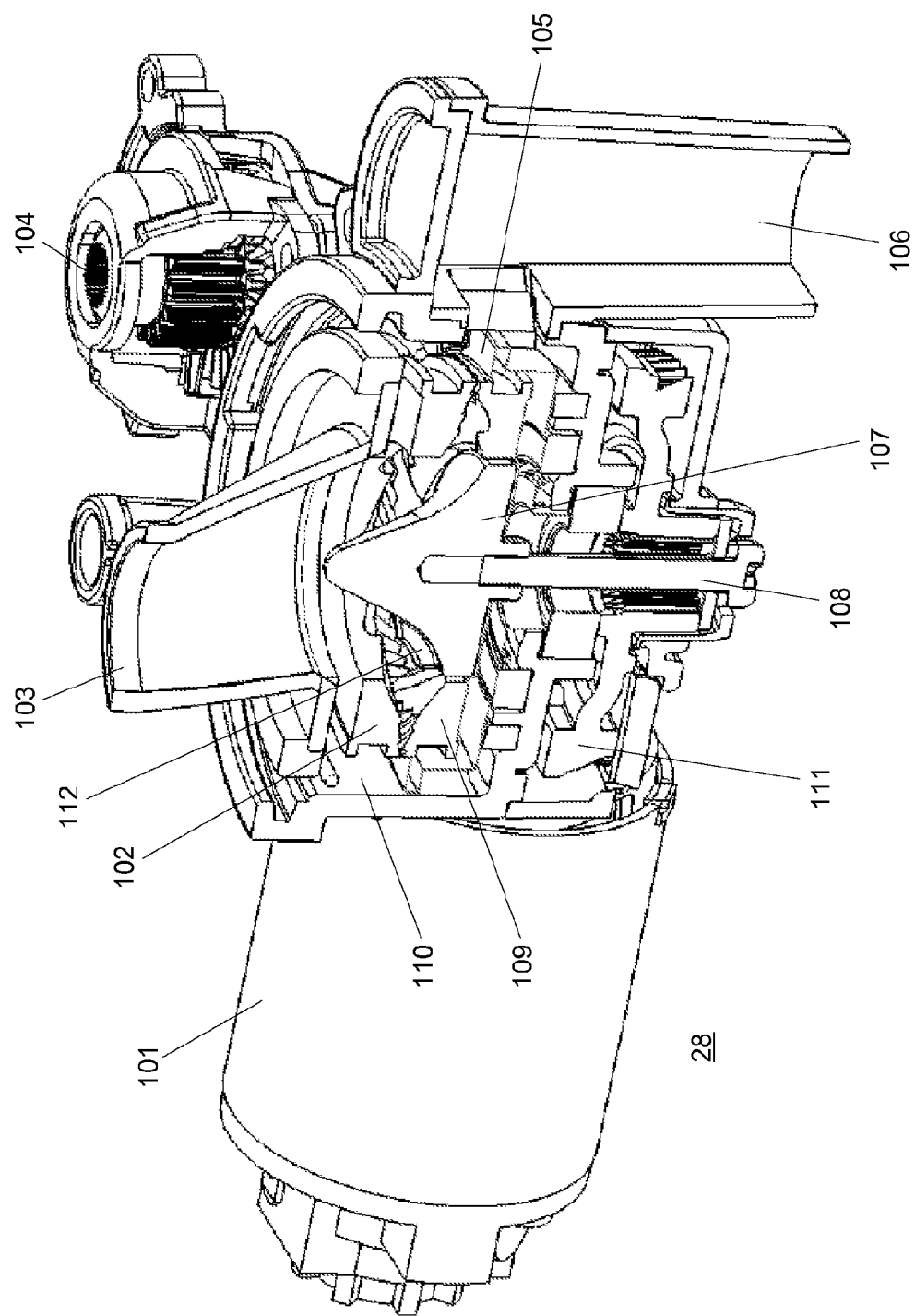
FIG. 3C shows a cross sectional view of the grinder used in the coffee brewing system according to FIG. 1 in perspective.
Figure 3D:
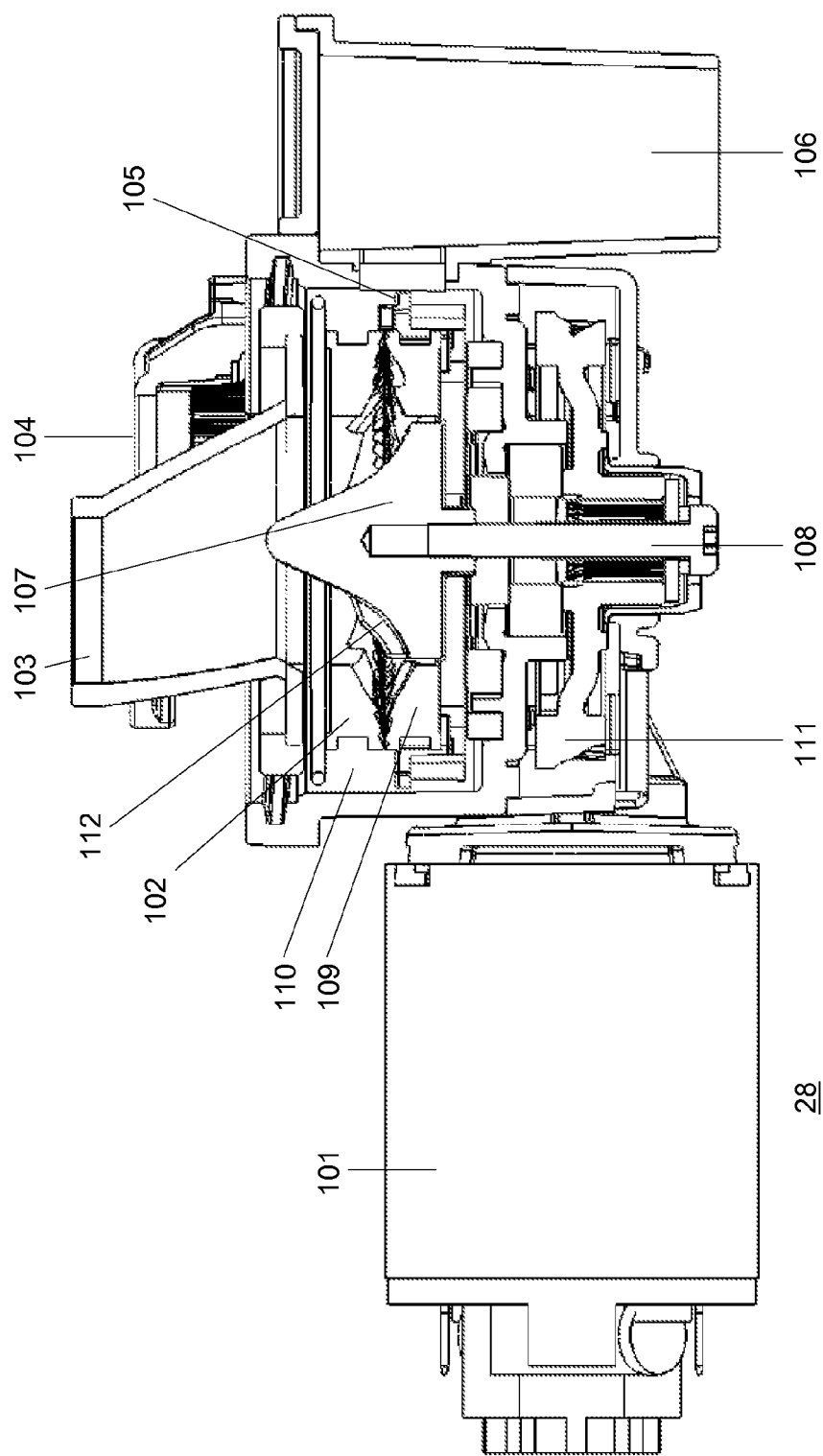
FIG. 3D shows a cross sectional view of the grinder used in the coffee brewing system according to FIG. 1.

The bottom part 27 of the metering chamber has a conical shape such that the bottom portion extends downwardly in a direction extending perpendicular to and away from a vertical axis 35. The grinder 28 in this embodiment is positioned centrically with respect to the second chamber portion 25. Referring now to FIGS. 3C and 3D, the grinder will be described in more detail. The grinder comprises a second motor (grinder drive motor) 101 and an upper grinding disk/wheel 102, which may be ceramic or steel. The upper grinding disk/wheel is rotationally fixed in its position. Furthermore, the second chamber 103 of the metering chamber is shown (referred to by reference 25 in FIGS. 3A and 3B), which works as dosing funnel. The grinder furthermore comprises a manual adjustment lock 104 to adjust the grind fineness setting by the consumer. The upper grinding disk 102 is moved up or down in respect to the lower grinding disk/wheel 109 when this key is turned. When the adjustment lock is operated, the upper grinding disk moves up and down and the lower grinding disk stays in place. In this way the size of the grind at the exit of the grinding disks, i.e. where they almost touch the outside of the grinder, is determined. The grinder furthermore comprises an exit location 105 for grinded coffee out of the circular transport channel 110 into the grinded coffee chute 106. The grinded coffee chute is a funnel pointing downwards into the brewing device 46 of the coffee brewing apparatus, which is open on the top and placed exactly below this chute when grinding. A rotating drive cone 107 (referred to as bottom part with conical shape 27 of the metering chamber in FIGS. 3A and 3B) is fixed on the main drive shaft 108. This cone ensures the movement and guidance of the beans out of the metering chamber into the grinding section consisting of the upper grinding disk 102 and the lower grinding disk 109, which may be ceramic or steel. The upper grinding disk 102 and the lower grinding disk 109 have a suitable milled shape for grinding the coffee beans, as is well known in the art. The main drive shaft drives the lower grinding disk 109 and the rotating drive cone 107. There is formed a circular transport channel 110, which transports the grinded coffee exiting out of the slit between upper and lower grinding disk to the exit location 105. The shape of the channel results in a "no contamination" grinder, wherein virtually no coffee beans/grinded coffee remains after finishing the grinding. Furthermore, the grinder comprises a motor transmission/gear 111 and a cone protrusion 112 to force the beans between the grinder disks.

The lower grinding disk 109 extends around rotating drive cone 107 and the upper grinding disk 102 extends above the lower grinder disk 109. The grinder is rotationally driven by motor 101 resulting in the rotation of the drive cone 107 and the lower grinding disk 109. Due to the shape of the cone protrusion 112 upon driving the drive cone 107 and the lower grinding disk coffee beans are moved in an outwardly extending radial direction between the lower grinding disk 109 and the upper grinding disk 102. Because a vertical distance between the lower grinding disk 109 and the upper grinding disk 102 decreases in the outwardly extending radial direction the beans are crunched and cut into grinded coffee.

As explained, grinder 28 supplies grinded coffee to a coffee brewing device 46 (schematically shown in FIGS. 3A and 3B) of the coffee apparatus. The coffee brewing device is arranged to receive a supply of water to extract a coffee beverage from the grinded coffee. The coffee beverage is discharged from a coffee beverage exit 37 from the coffee brewing apparatus into a cup or like household receptacle. A water supply can be arranged to supply water to the coffee brewing device under pressure for espresso type coffee beverages or may provide a drip feed to the extraction system formed by coffee brewing device.

Before operating the coffee beverage system, the user has to connect the coffee bean cartridge 3 to the coffee brewing apparatus 4.

Figure 4A:
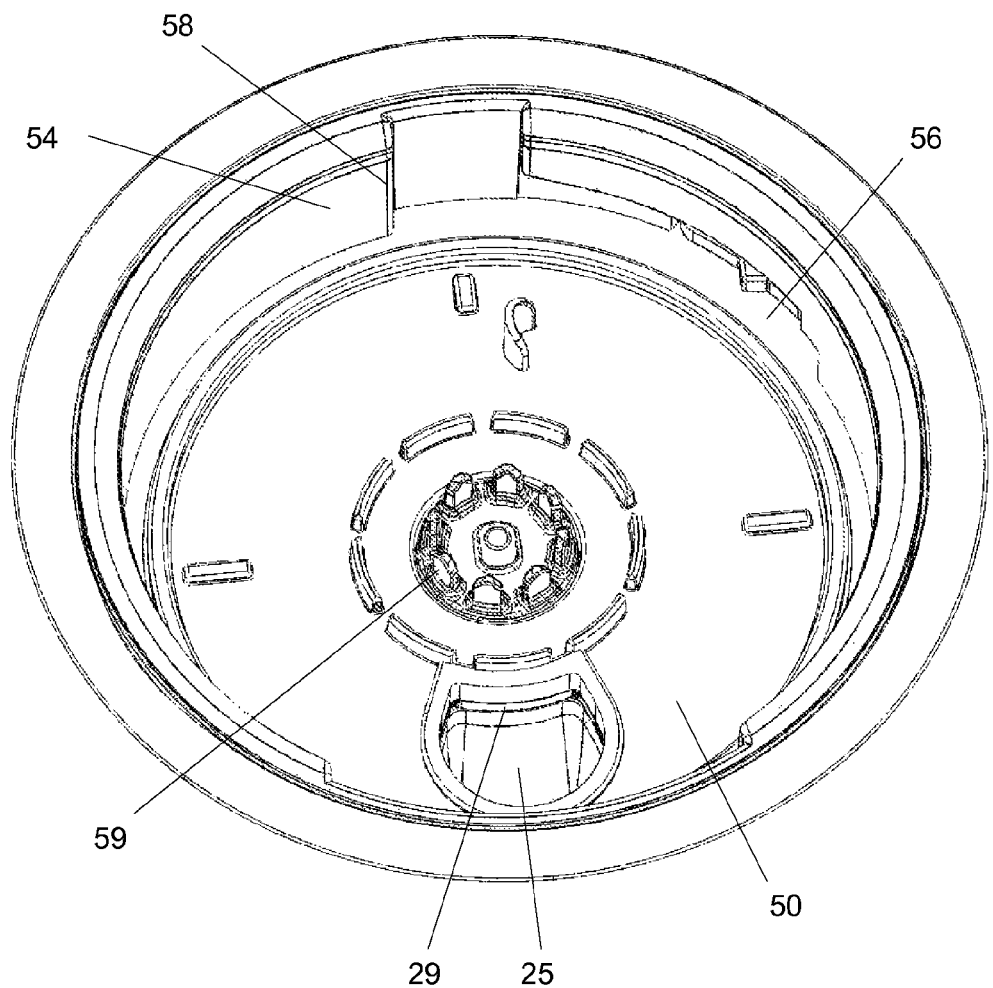
FIG. 4A shows a perspective detail view of the upper part of the coffee brewing apparatus of FIG. 2.
Figure 4B:
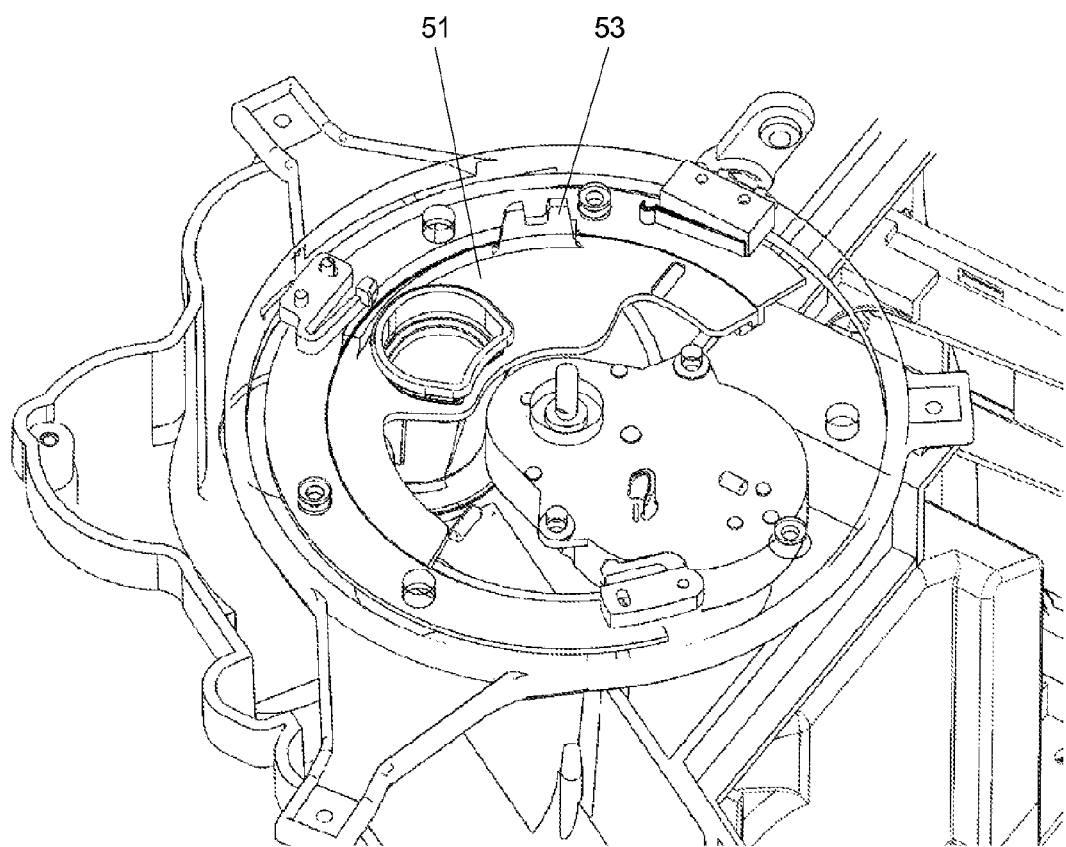
FIG. 4B shows a perspective detail view of the upper part of the coffee brewing apparatus of FIG. 2 with a closing plate in open position.

Referring now to FIG. 4A, the connection means for connecting the coffee bean cartridge 3 to the coffee brewing apparatus comprise a recess 50 at an upper side 52 of the coffee brewing apparatus 4. The recess 50 is surrounded by a side wall 54 protruding from the upper side of the coffee brewing apparatus 4. The user should place the corresponding part of the first/second cartridge, at a lower side of the coffee bean cartridge into the recess. The bayonet elements to be described later of the cartridges should be placed in the corresponding openings 58 in the side wall 54 of the recess 50. The user should then rotate the cartridge over 50 degrees until reaching the blocking elements 56 for impeding a further rotation of the coffee bean packaging cartridge. At this position the exit opening 29 of the first chamber portion 23 is aligned with the coffee inlet 9 of the second chamber portion 25. When the cartridge 3 is removed from the coffee brewing apparatus, the second chamber portion 25 in the appliance is closed by means of an appliance closing plate 51 (FIG. 4B) The appliance closing plate is being driven by a protrusion 1686 (FIG. 6C) on the neck of the cartridge which slots into a keyhole 53 on the appliance closing plate as the cartridge is being placed into the openings 58 in the side wall 54 of the recess 50. As the user rotates the cartridge over a 50 degrees angle during placement the closing disk in the consumable and the closing plate in the appliance are opened, simultaneously.

Figure 5A:
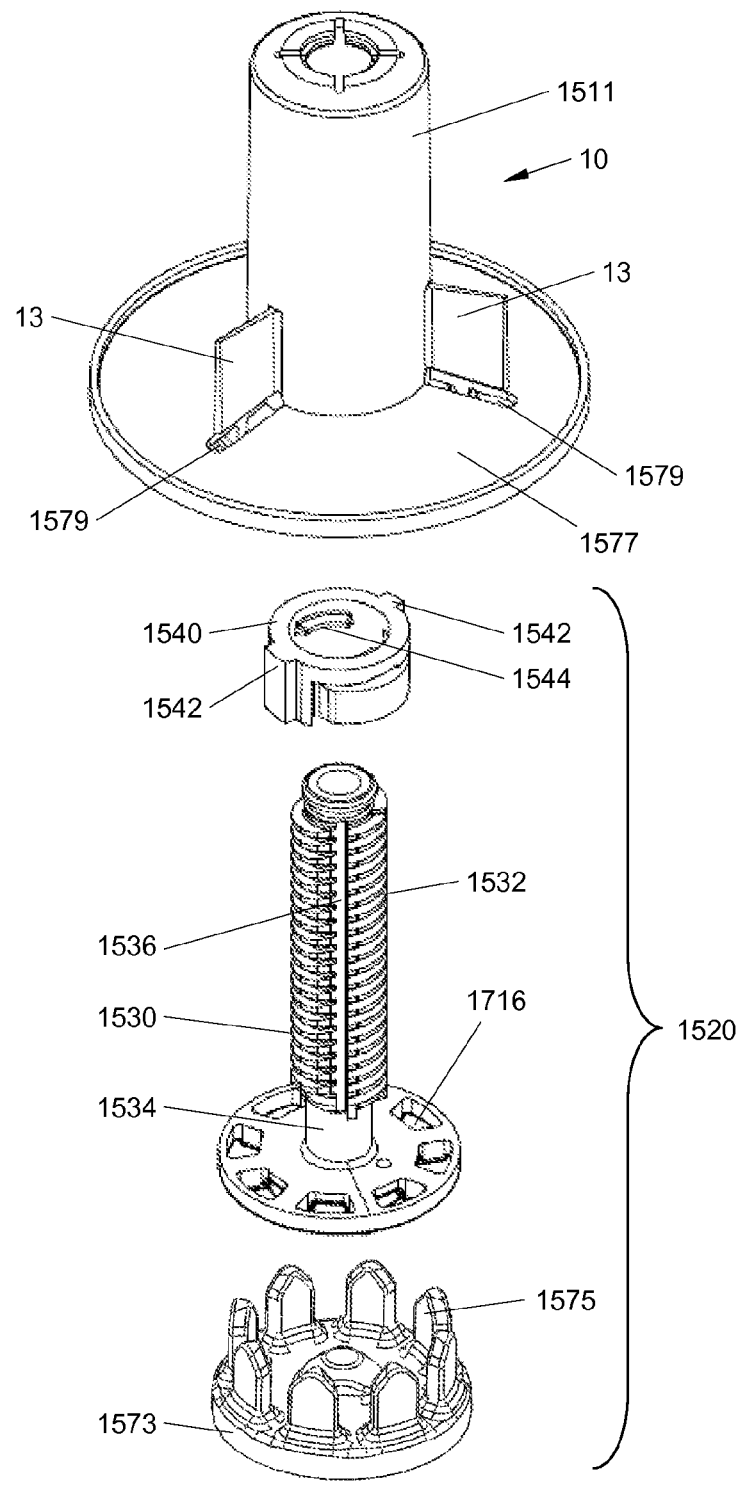
FIGS. 5A and 5B are two isometric exploded views of an impellor used in the coffee bean packaging cartridge of the first type together with driving means and a drive shaft coupling end.
Figure 5B:
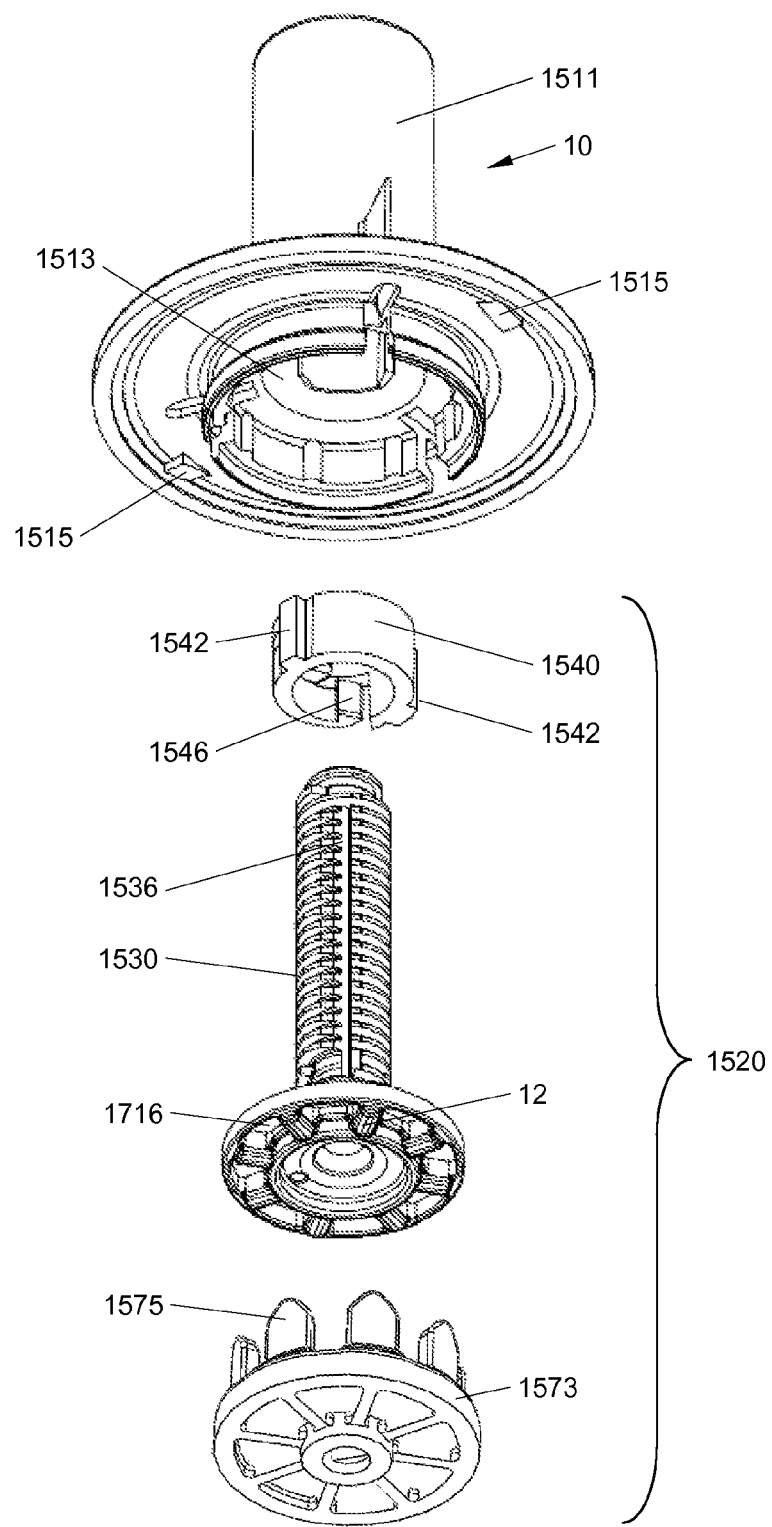
Figure 5C:
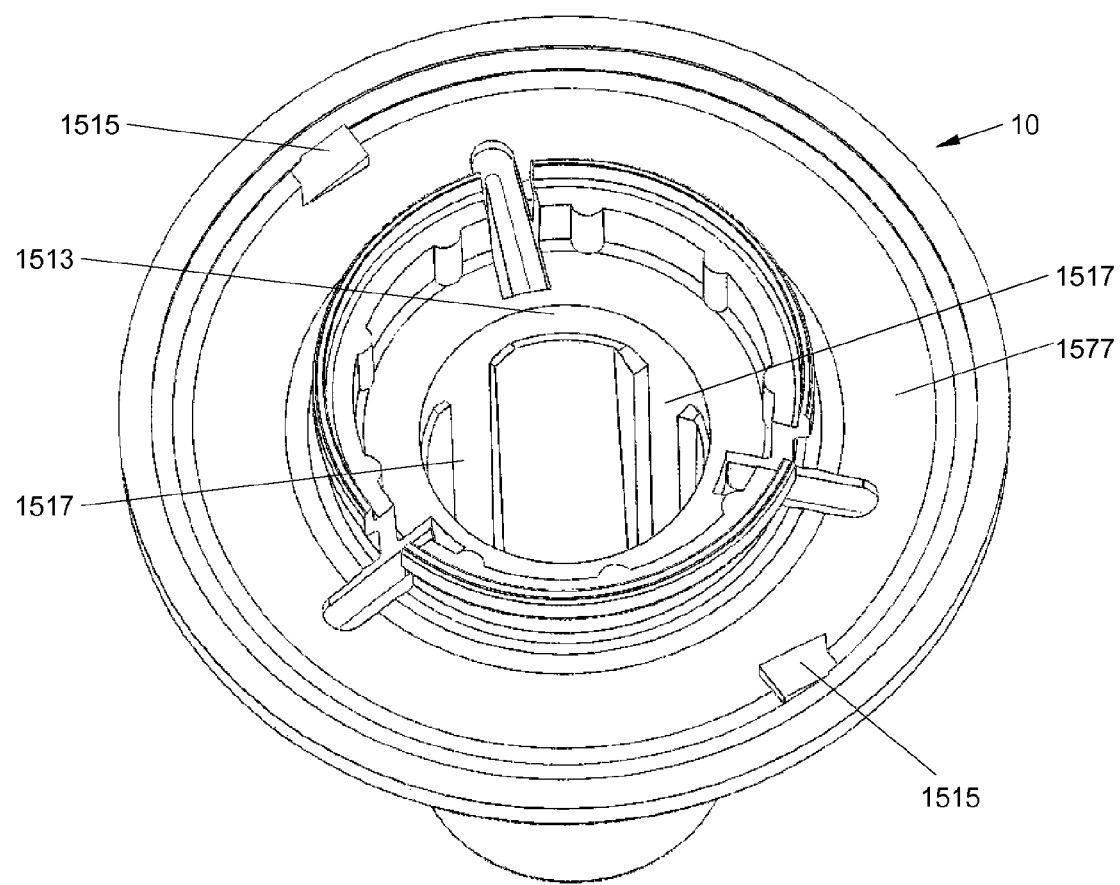
FIG. 5C shows a perspective bottom view of the impellor used in the coffee bean packaging cartridge of the first type.
Figure 5D:
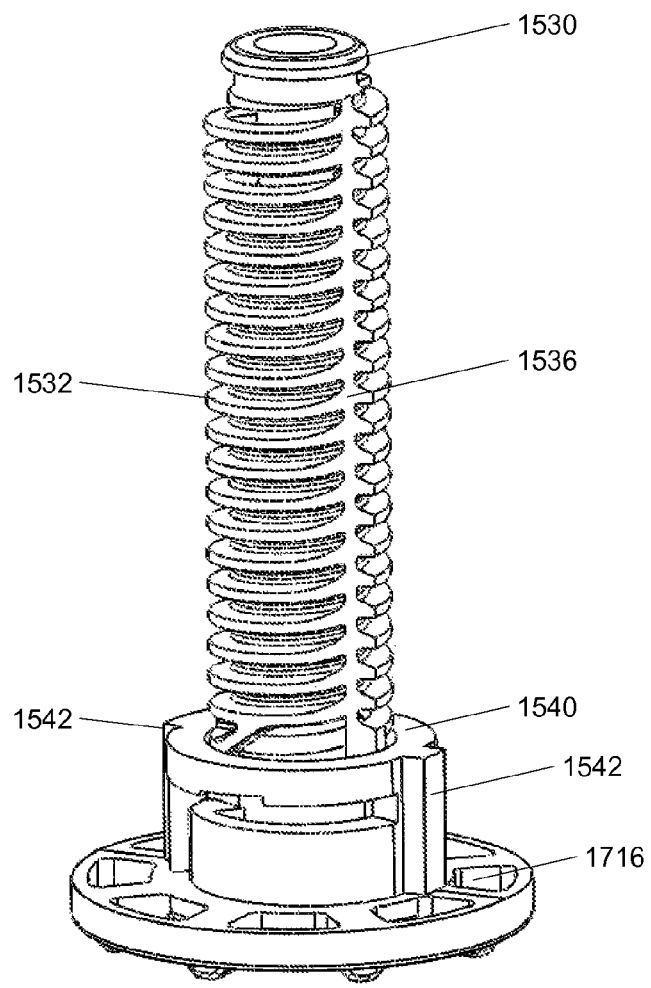
FIG. 5D shows a perspective view of the drive means used for driving the impellor used in the coffee bean packaging cartridge of the first type.
Figure 5E:
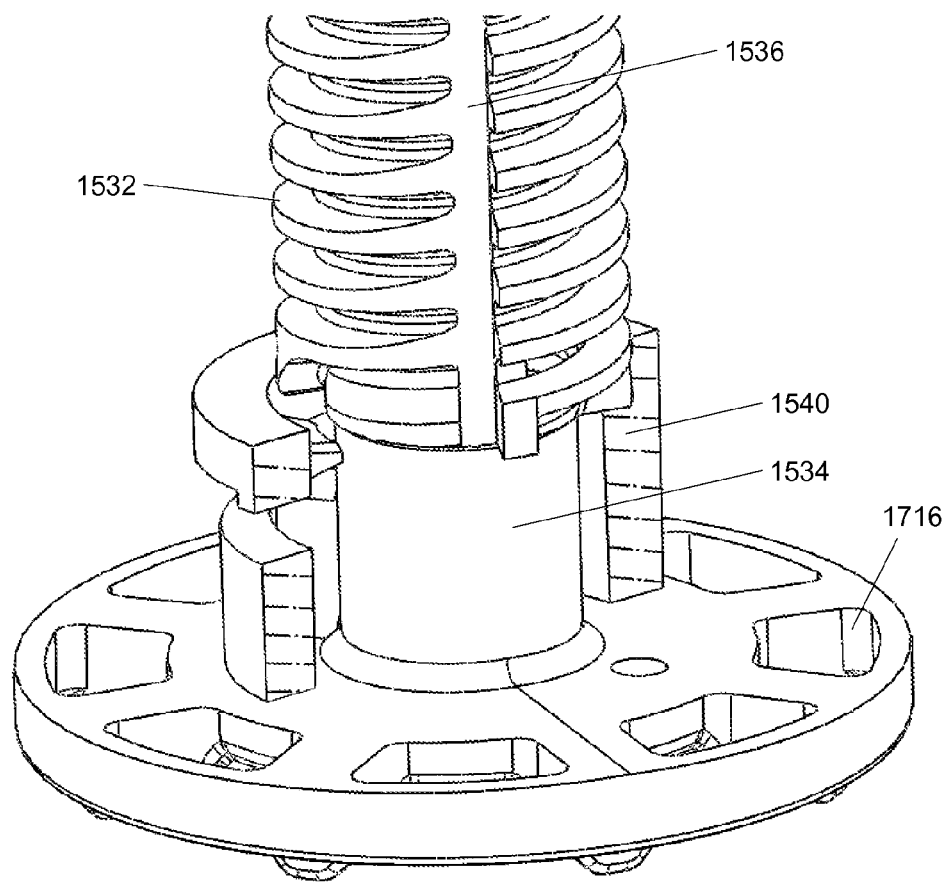
FIGS. 5E and 5F show a perspective detail view of the lower part of the drive means at the time of reaching a final position.
Figure 5F:
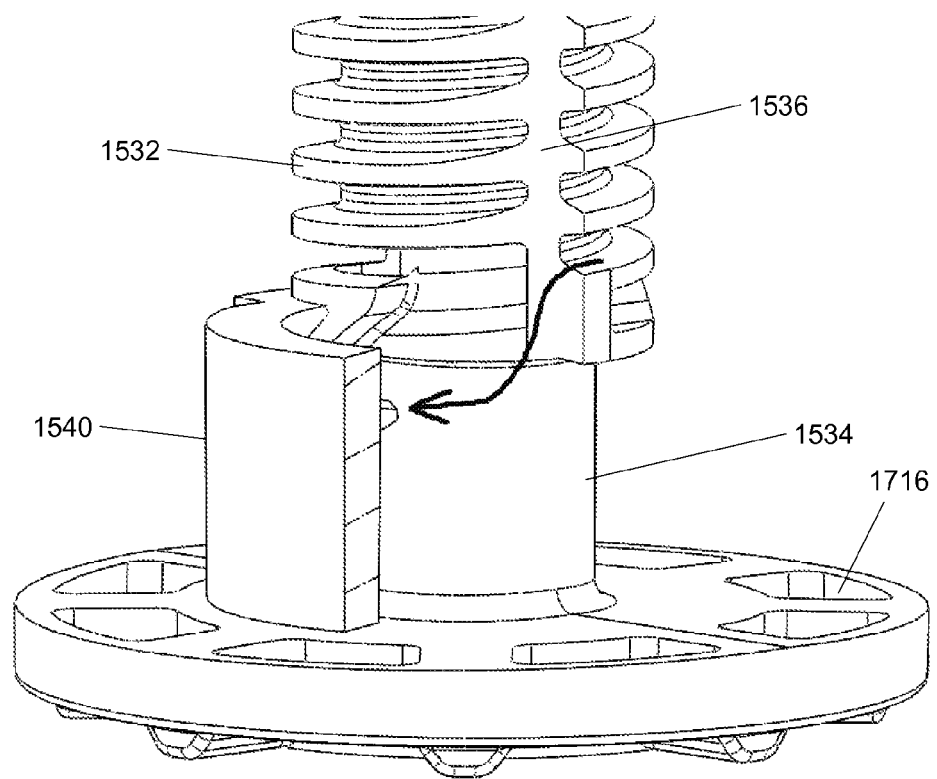

An example of a first impellor 10 and its corresponding drive means 1520 is shown in more detail in FIGS. 5A-5J. To prevent the impellor 10 to get jammed by coffee beans that become locked between the perimeter aperture and radially extending vanes 13, such vanes 13 are preferably made from a resilient material. It is also possible to make the entire impellor 10 from a yieldable resilient material. As illustrated in FIG. 5A the vanes 13 do not extend to the perimeter edge of the impellor 10, which may prevent beans from becoming jammed between the vanes 13 and the perimeter aperture. As indicated hereinabove the vanes may also be of a flexible material and to provide more flexibility to the vanes the vanes are conveniently also unattached to the impellor base 1577 (bottom), by leaving a gap 1579.

The first impellor 10 has a hollow hub portion 1511. The drive means 1520 are inserted in the recess in the interior of the hollow hub portion 1511. The drive means 1520 includes a drive bush 1530 and a nut 1540, which are both part of the first cartridge. The drive means 1520 furthermore includes the drive shaft 18 (see FIG. 3A, 3B).

Nut 1540 is mounted on drive bush 1530. The two pieces are connected by means of the screw thread 1532 covering most of the surface of the drive bush 1530 and the corresponding screw thread 1544 at the interior of nut 1540. Nut 1540, when the system is in operation, climbs down along the screw thread, as will be discussed in detail herein after. Nut 1540 comprises two protrusions 1542, each of the protrusions engaging with one of the four slots 1517 (see FIG. 5C), which vertically extend along most of an interior wall 1513 of the hollow hub portion 1511. At the bottom of the impellor base there are edges 1515 being part of a ratchet connection together with scores 1630 (see FIG. 9A).

Drive shaft end 1573 of the coffee preparing appliance has a number of keys 1575 (preferably 4, 6 or 8, referred to with reference number 59 in FIG. 4) for engagement with openings 1716 formed by corresponding protrusions 12 at the bottom side of the drive bush 1530. To facilitate engagement of the first impellor 10 and the drive shaft end upon placing of the cartridge on the appliance the number of keys may differ between the drive shaft end 1573 and the drive bush 1530.

A part 1534 at the lower end of the drive bush 1530 is not covered with the screw thread 1532. This part 1534 is opposite to the part of wall 1513 at which the vertically extending slots 1517 are not present.

There are two vertically extending interruptions 1536 (only one of them is visible in FIGS. 5A, 5B) in the screw thread at opposite sides of the drive bush 1530. The interruption in the screw thread at a first side (the right side in FIGS. 5A,5B) is abrupt and at a second side (the left side in FIGS. 5A,5B) is gradual (i.e. a ramp), i.e. the thickness of the screw thread gradually increases from nothing to the normal thickness, as can be appreciated in FIGS. 5D-5G. At opposite sides of the interior of nut 1540, there is a corresponding edge 1546 (see FIGS. 5B and 5G), which is asymmetrically shaped, such that, when the edge 1546 is inserted in one of the slots 1536, the highest thickness of the edge corresponds to the side of the interruptions where the thickness of the screw thread is nil and the lowest thickness correspond to the other side of the corresponding interruption 1536. So, the shape of the edge 1546 and the interruptions 1536 is such that they enable the movement of the nut along the screw thread in downward direction and impede the movement of the nut in the opposite upward direction, as is well known in the art.

Figure 6A:
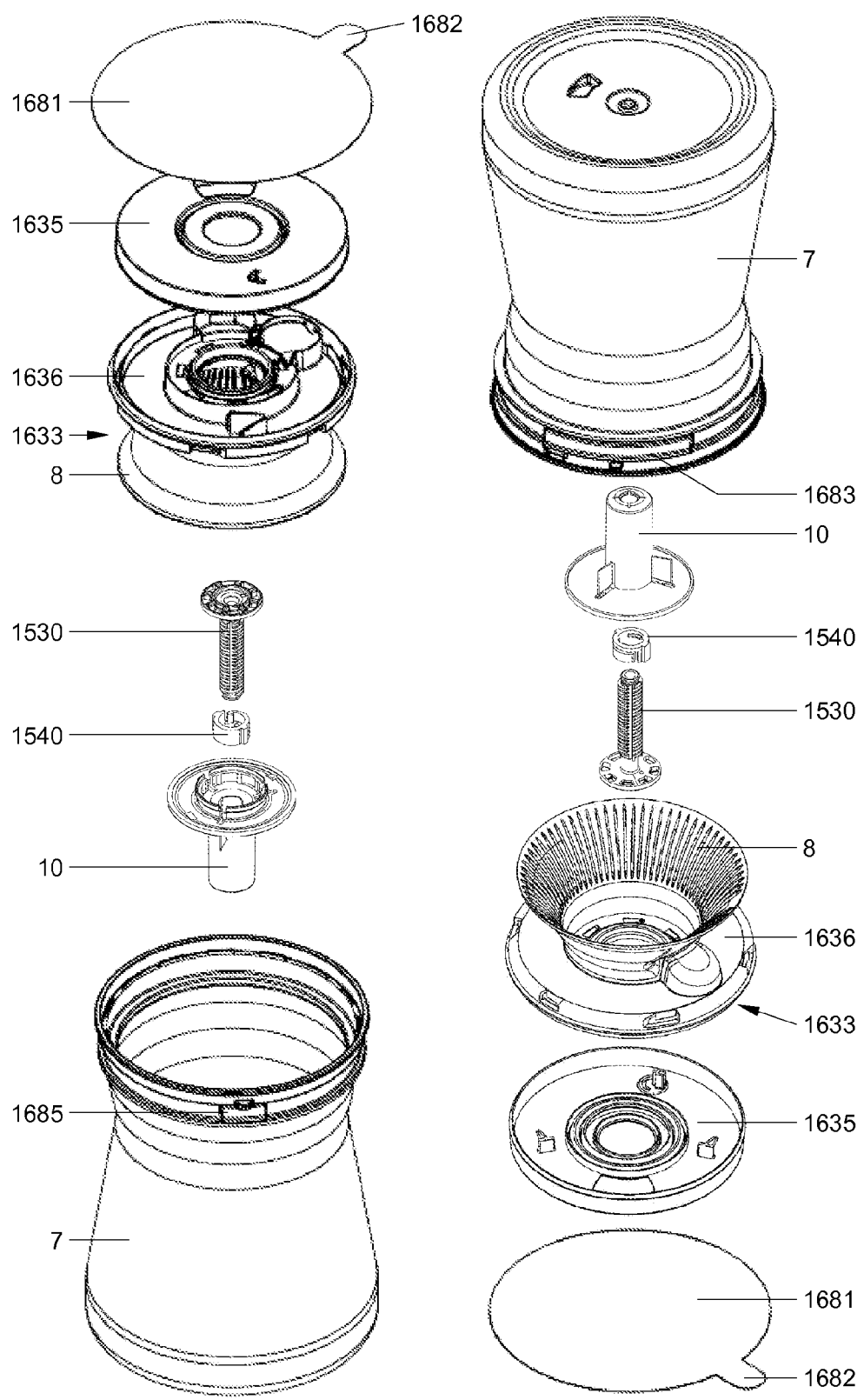
FIG. 6A is an exploded isometric view of a coffee bean packaging cartridge of the first type according to an embodiment of the invention.
Figure 6B:
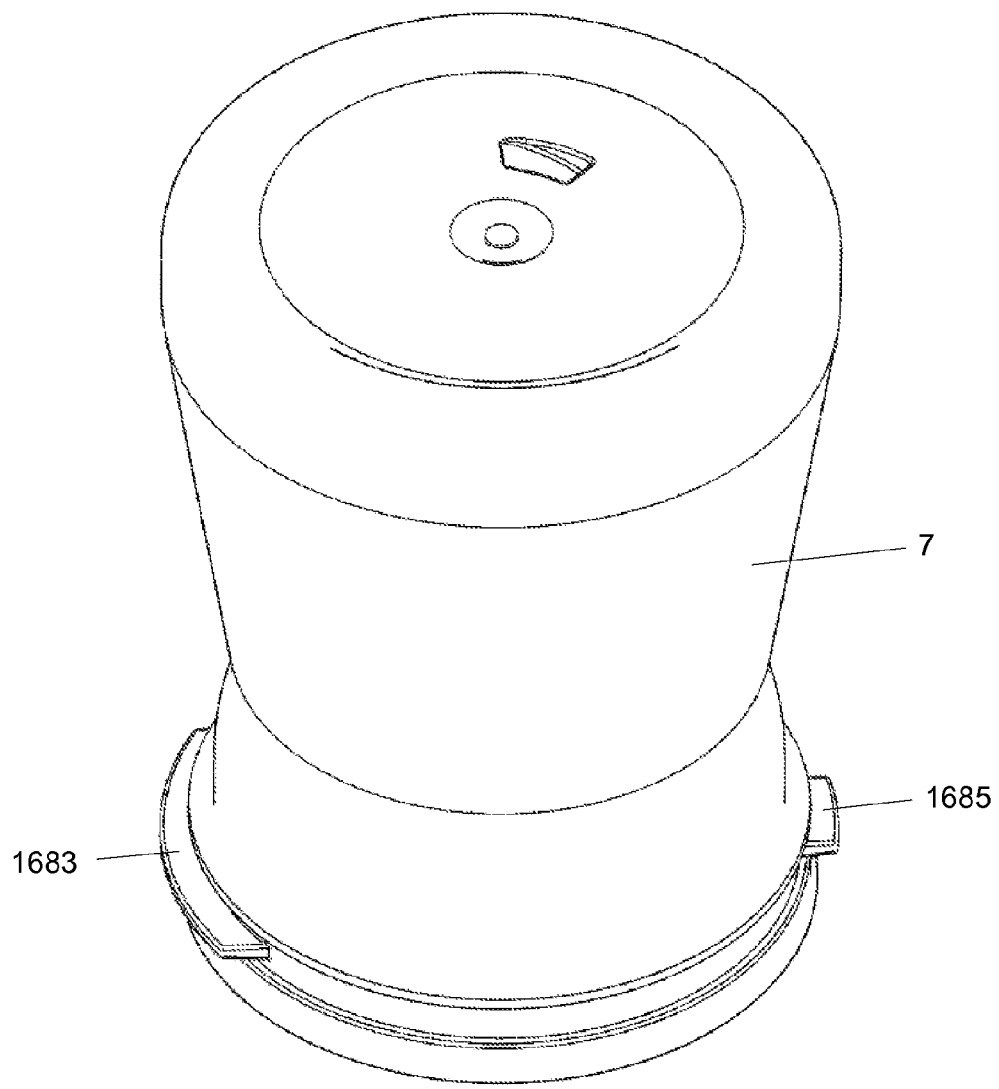
FIGS. 6B and 6C show two different perspective views of the coffee bean packaging cartridge shown in FIG. 6A.
Figure 6C:
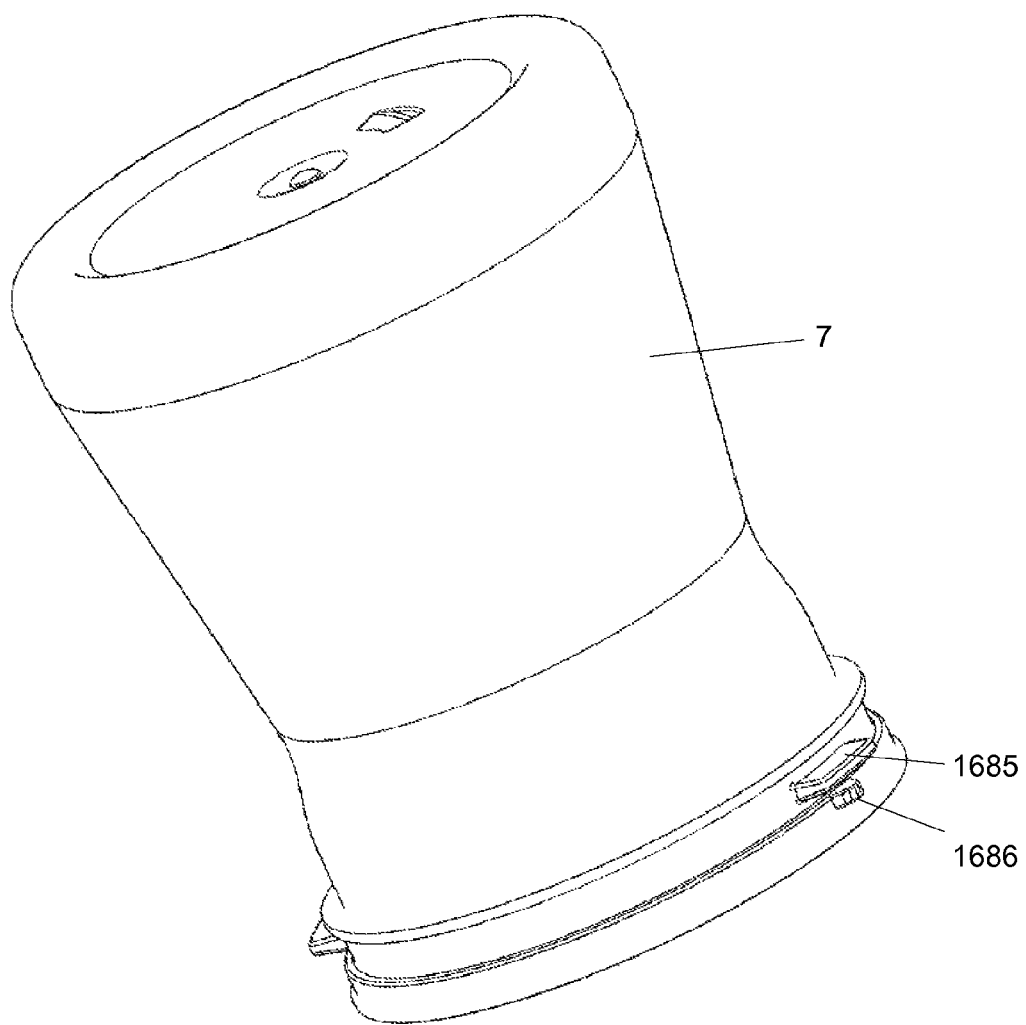

Referring to now to FIGS. 6A, 6B and 6C an embodiment of the coffee bean packaging cartridge 3 of the first type, i.e. with anti-refill impellor 10, is shown in an exploded arrangement, perspective views and cross sectional view. This packaging cartridge includes the container 7 defining an interior volume for coffee beans. The container 7 is preferably made from a transparent material so that its contents can be seen. Optionally, the container 7 may be partially covered by an outer sleeve (not shown) which may be printed with a description of the kind of coffee beans inside and may also be apertured to reveal a translucent portion of the container 7. The container 7 is also provided at a lower end thereof with bayonet formation 1683, 1685 for coupling with the openings 56 in the side wall 54 of the recess 50 of the coffee brewing apparatus 3. Inserted into an open bottom end of container 7 is a closure member 1633. The closure member 1633 has the ribbed funnel 8 for guiding coffee beans towards the impellor 10 and a base flange 1636. A rotatable closure disk 1635 is rotatably connectable with respect to the base flange 1636 of the closure member 1633. The closure member 1633 and the rotatable closure disk 1635 together form an interface between the cartridge and a coffee brewing apparatus. The assemble cartridge can be sealed against deterioration from the ambient air by a sealing membrane 1681 that attaches to the perimeter edge of the container 7. The sealing membrane and barrier foil 1681 may again be equipped with a conventional one-way pressure relief valve for venting excess pressure from gases emanated from freshly roasted beans to the exterior of the packaging cartridge. Preferably such a venting valve should open at a pressure of between 0.1 bar and 0.5 bar to prevent deformation of the container by inflation. To facilitate removal of the sealing membrane 1681 before placing the cartridge on a brewing apparatus, a pulling tab 1682 may be provided.

FIGS. 6B and 6C show two different perspective views of the coffee bean packaging cartridge shown in FIG. 6A.

Figure 7A:
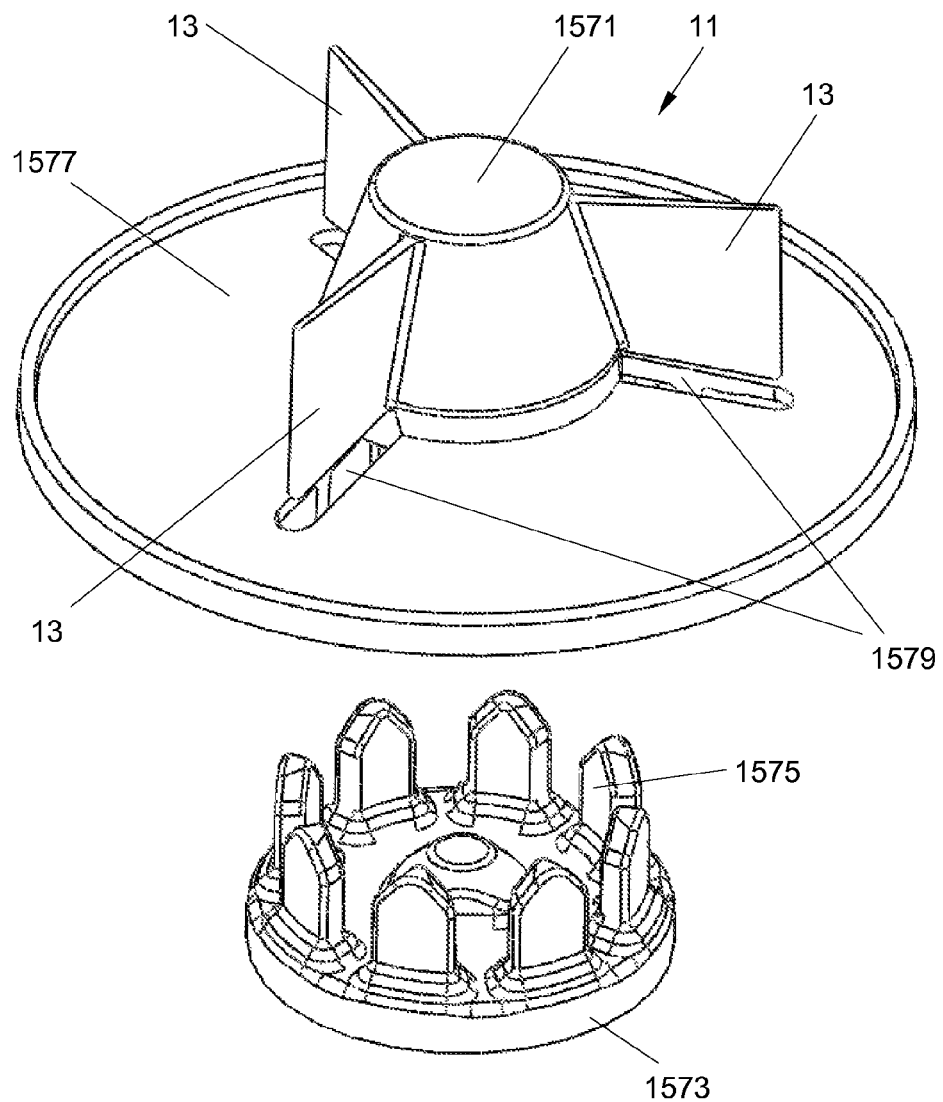
FIGS. 7A and 7B are two isometric exploded views of an impellor used in the coffee bean cartridge of the second type together with a drive shaft coupling end.
Figure 7B:
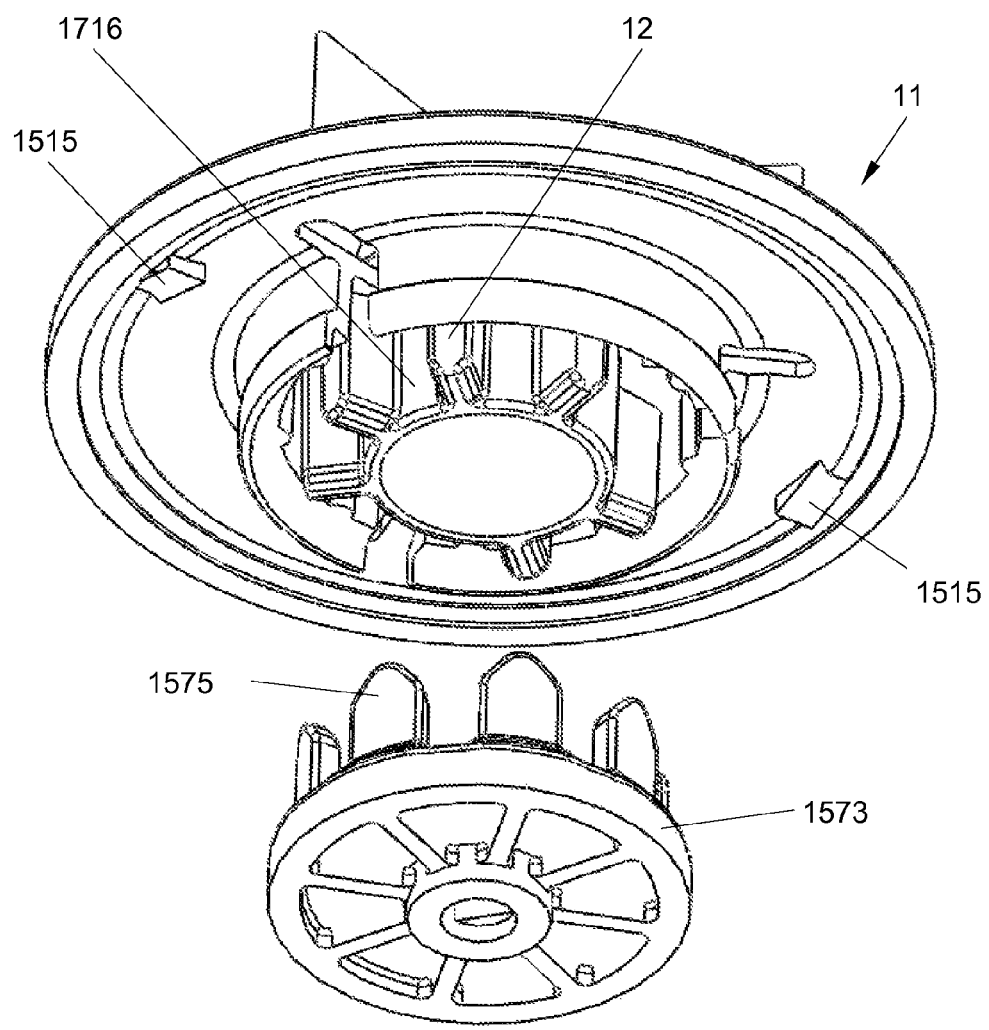

One suitable form of the second impellor 11 without antirefill mechanism is shown in detail in FIGS. 7A and 7B. The features of the second impellor 11, which are similar to those of the first impellor 10, are indicated with the same reference numbers. The impellor 11 has a hollow hub portion 1571 engageable by the drive shaft end 1573 of the coffee preparing appliance, which for this purpose has a number of keys 1575 (preferably 4, 6 or 8) for engagement with corresponding protrusions, or keys in the interior of hollow hub 1571.

Figure 8:
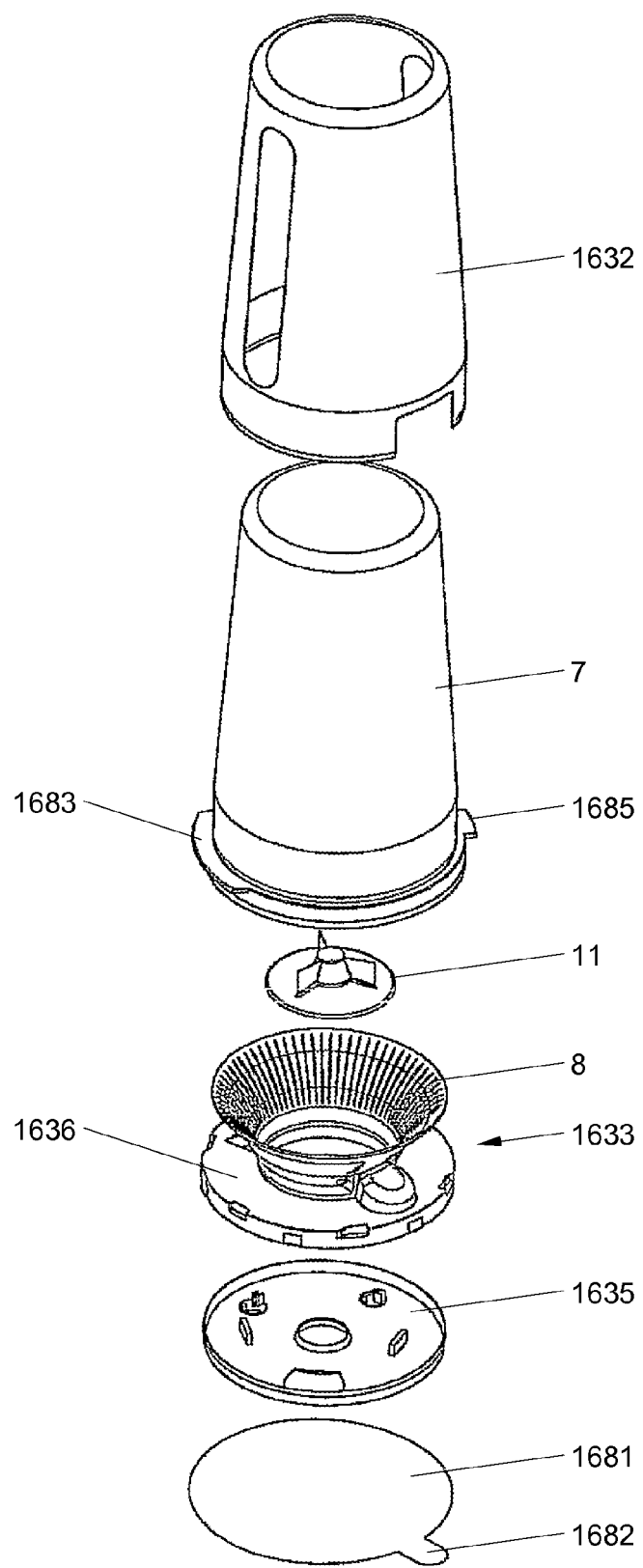
FIG. 8 is an exploded isometric view of a coffee bean packaging cartridge of the second type according to an embodiment of the invention.

Referring to FIG. 8 an exploded view of the second cartridge is shown. It can be appreciated that, with exception of the used impellors and the drive means thereof, the second cartridge is the same as the first cartridge. Therefore, the perspective view of the second cartridge is the same as the perspective view of the first cartridge, as shown in FIGS. 6B and 6C. In FIG. 8, the outer sleeve 1632 is shown, which may cover the container 7. The outer sleeve may be printed with a description of the kind of coffee beans inside and may also be apertured to reveal a translucent portion of the container 7.

Figure 9A:
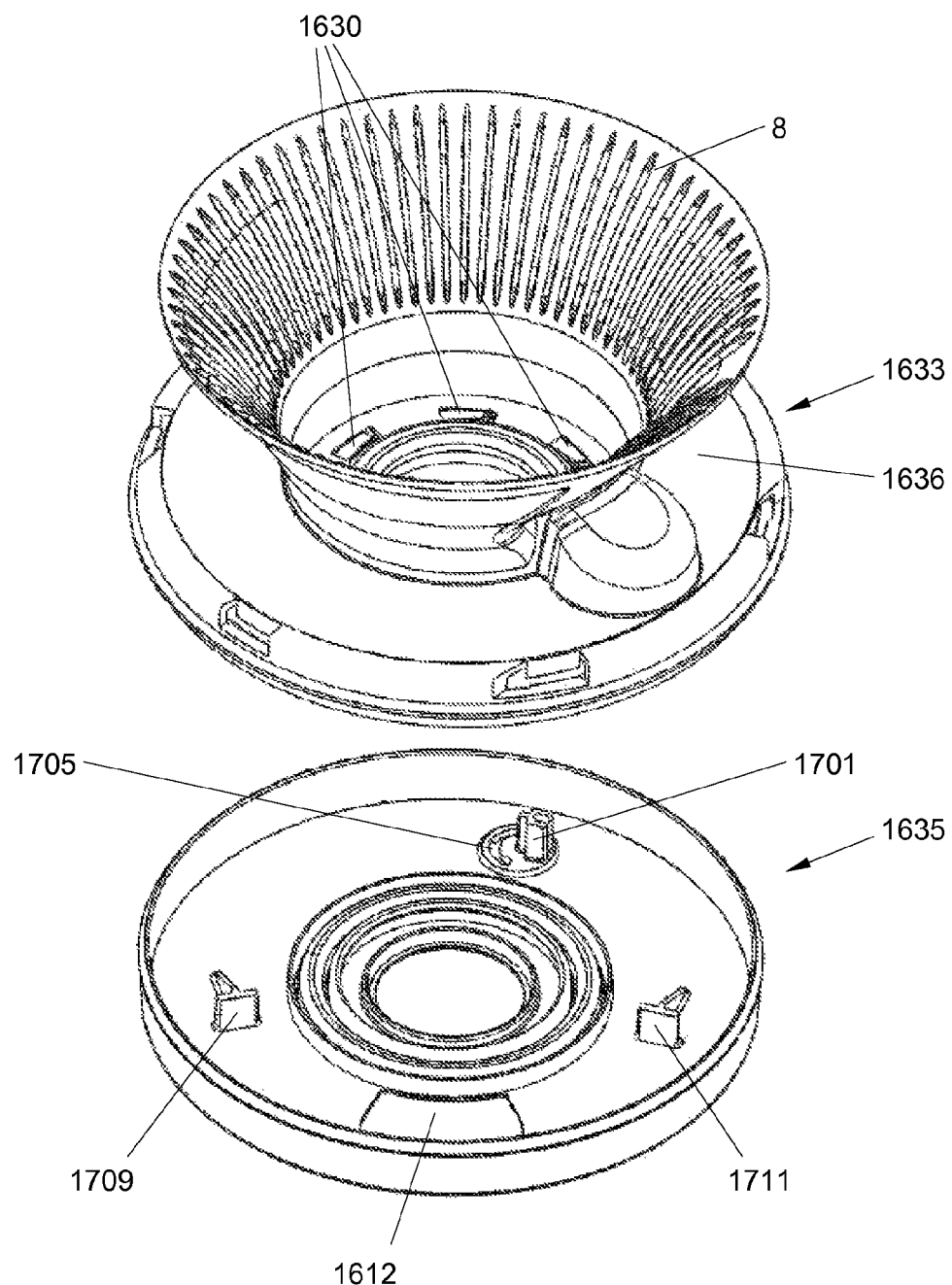
FIG. 9A is a detailed exploded isometric view of the bottom part of the coffee bean packaging cartridge of FIG. 6A.
Figure 9B:
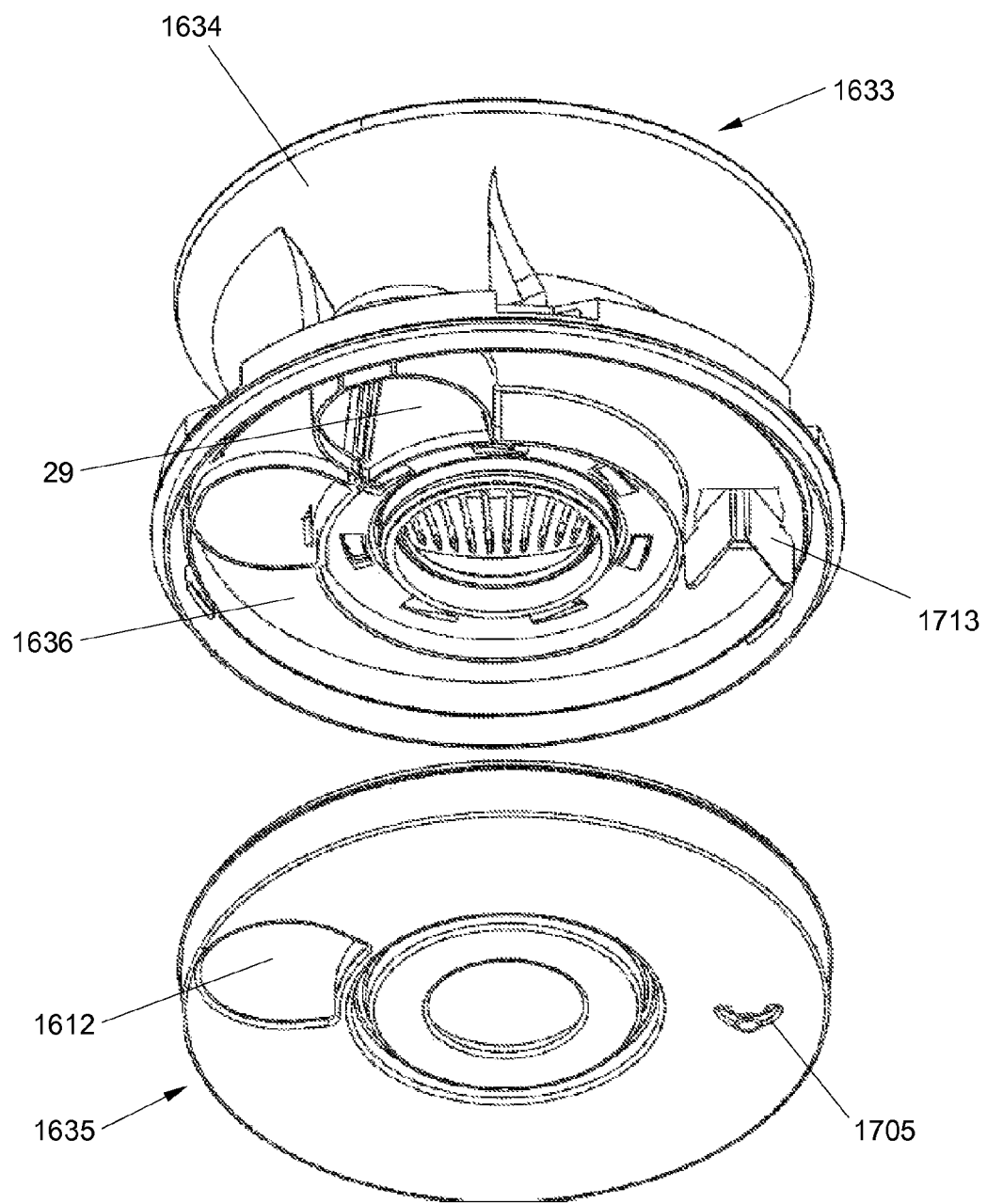
FIG. 9B is a detailed exploded view of the bottom part of FIG. 9A as seen in an opposite direction.
Figure 9C:
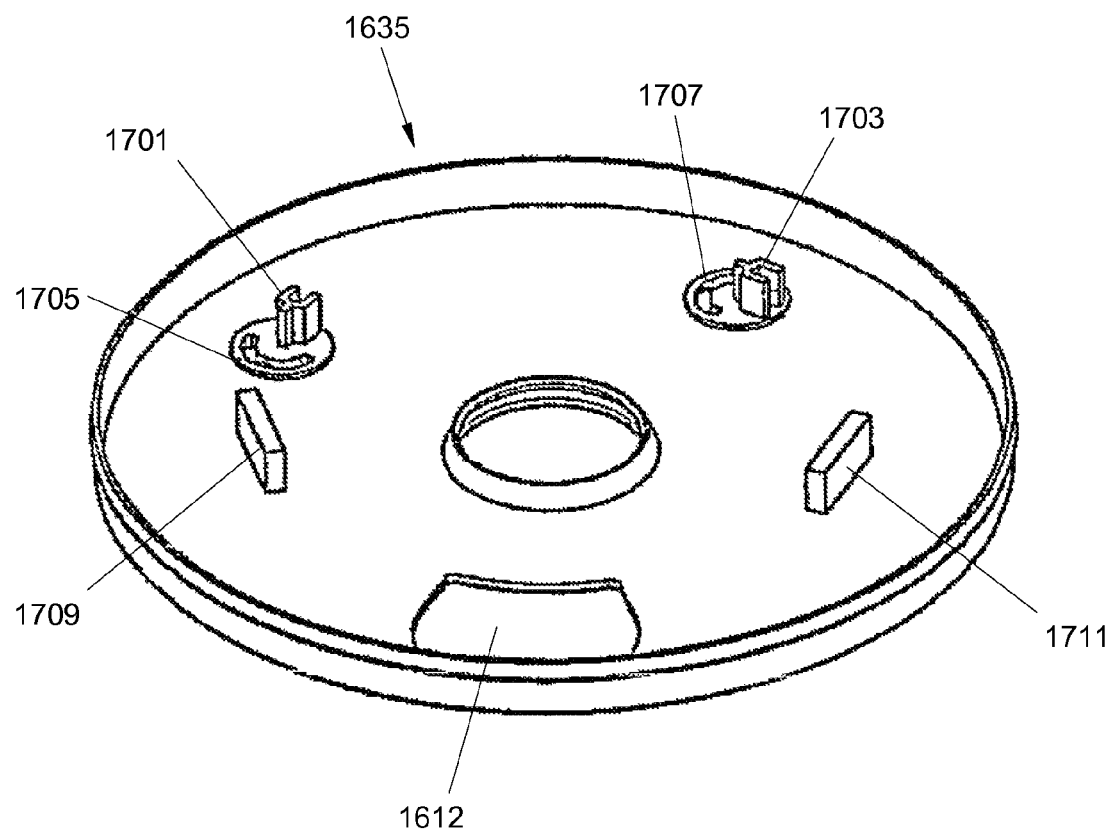
FIG. 9C is a perspective view of a closing plate of the bottom part shown in FIGS. 9A and 9B.

The interface forming bottom parts of the first/second cartridge are separately shown in more detail in FIGS. 9A, 9B and 9C. The ribbing on funnel 8 as further seen in the exploded view of FIG. 9A is useful in preventing sticking of coffee beans to the surface of the funnel 8.

By appropriate spacing between the successive ribs on funnel 8 it is possible to minimize the contact surface between the beans and the funnel surface. As the skilled person will recognize, such ribbing is merely one of various ways to reduce the contact surface and protruding bulges may be equally effective. Also the inclination given to the funnel may be subject to variation, but an angle in excess of 30 degrees, up to 90 degrees has been found effective.

The rotatable closing disk 1635 has an aperture 1612, which upon appropriate rotation can register with exit opening 29 of the closure member 1633 (see FIG. 9B). The closing disk 1635 on its upper surface has protruding there from a first detent 1701 and a second detent 1703 (see FIG. 9C). The first abutment is bordered by semi-circular slots 1705 and 1707, respectively. Additionally, protruding from the upper surface of the rotatable closing disk 1635 is a first abutment 1709 and a second abutment 1711 for limiting rotational movement in respect of the exit opening 29. Further provided on a bottom face of the base flange 1636 of the closure member 1633 is a first pair of latching arms 1713 and a second pair of latching arms (not shown). The first pair of flexible latching arms 1713 is positioned to cooperate with the first detent 1701 in the closed position of the rotatable closure disk 1635. The second detent 1703 and the second pair of flexible latching arms also cooperate together in the closed position of the closure disk 1635 and are optional.

Figure 10:
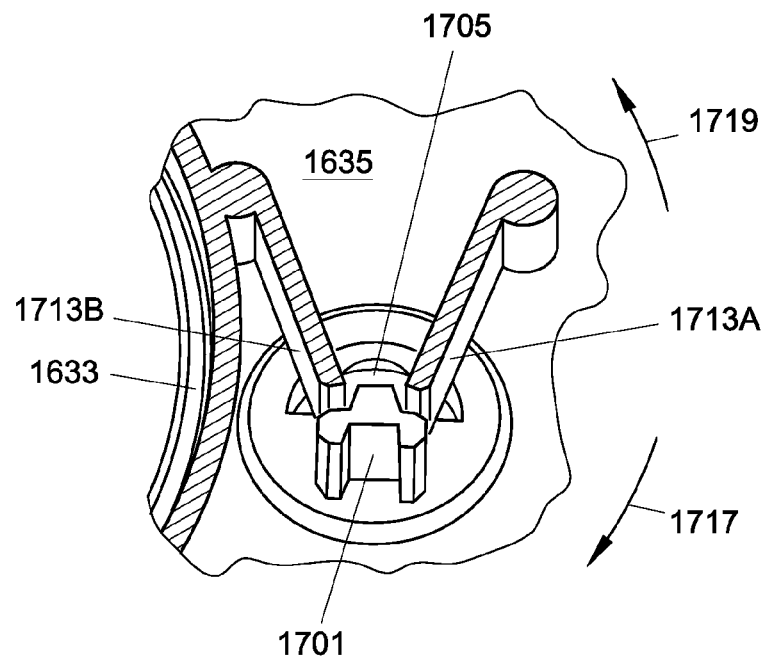
FIG. 10 is a cross-sectional detail of the assembled bottom part.

In reference to FIG. 10 it is shown how the first detent 1701 has been caught behind the converging flexible arms 1713A and 1713B of the first part of flexible arms. The position of the detent 1701, as shown in FIG. 10, has resulted from rotation of the closure disk 1635 in respect of the closure member 1633 in the direction of arrow 1717. Rotation in the opposite direction of arrow 1719 is effectively prevented by the flexible arms 1713A and 1713B engaging the first detent 1701. Accordingly when the cartridge is in the closed position as determined in the partial cross-section of FIG. 10 it may be removed from the apparatus without any risk of spilling beans. Also this latching arrangement ensures that the cartridge is not accidentally opened by rotation of the closure disk 1635.

Figure 11:
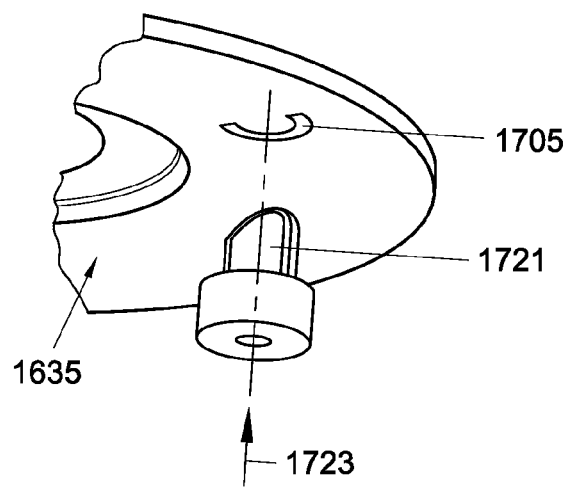
FIG. 11 is a bottom perspective detail of the bottom part of FIG. 9B with a delatching protrusion of the coffee brewing apparatus.

As shown in FIG. 11 an unlocking element 1721, which is part of a coffee brewing appliance, can engage through the semi-circular slot 1705 in the direction of arrow 1723 when the cartridge is placed on the appliance. The unlocking element 1721 has a V-shaped upper contour that forces apart the flexible arms 1713A and 1713B of the first pair of flexible arms 1713. This will then allow rotation of the closure disk 1635 in the direction of arrow 1719 by allowing the first detent 1701 to pass between the spread apart flexible arms 1713A and 1713B. This rotating movement is obtained by manually rotating the cartridge with respect to the appliance to engage the bayonet means 1683, 1685 on the container 7 with the counter bayonet formations 56 on the brewing apparatus.

The operation of the second detent 1703 in respect of the second pair of flexible latching arms is identical and when optionally provided will give additional protection against accidental opening, when not engaged on a coffee brewing apparatus.

Referring to FIG. 4 again, the recess 52 comprises rotatable protruding edges 59 (referred to with reference number 1575 in FIGS. 5A,5B, 7A and 7B) at its center, which are positioned at the end of the driving shaft 18, which is driven by the first motor 17. On these edges the corresponding openings 1716 at the bottom side of the drive bush 1530 of the first impellor 10 should be placed, in case of using the cartridge of the first type with anti-refill mechanism. In case of using the cartridge of the second type without anti-refill mechanism, the opening 1716 on the bottom side of the second impellor 11 at the bottom side of the second cartridge 3 should be placed on these edges 59. The openings 1716 receive the edges 59 when the cartridge is connected with the coffee brewing apparatus.

The upstanding side wall 54 of the recess 52 may be surrounded by a housing 55, as shown in FIGS. 1-2.

The coffee brewing apparatus comprises a control device unit 40 schematically shown in FIGS. 3A and 3B, preferably a microprocessor for controlling the dosing, grinding and brewing process as well as the anti-refill mechanism in case of using a cartridge of the first type. The controller may activate these processes after that it has detected that the cartridge 3 has correctly been connected to the coffee brewing apparatus 4.

For filling of the dosing volume the conveying impellor 10/11 is rotated with a rotational speed in the range of 100 to 500 rpm, and preferably between 250 and 300 rpm. To fill the metering chamber some fifteen revolutions of the impellor 10/11 (i.e. the bottom 1577 and the vanes 13) will normally suffice. However, to ensure filling under even adverse conditions, it may be convenient to allow for some extra revolution such as thirty or twenty-five in total. For filling of the dosing volume the conveying impellor 10/11 is rotated with a rotational speed in the range of 100 to 500 rpm, and preferably between 250 and 300 rpm. Once the filling of the dosing volume has been accomplished, the appliance will switch from driving the impellor 10/11 to driving its grinder. With the impellor 10/11 immobilised the metering chamber will gradually empty into the grinder. Because the impellor 10/11 is inactive, no beans will escape from container 7, also because of the presence of the trickle through edge 22.

According to an embodiment, the controller controls these processes as follows. In a first step the metering chamber is completely filled with coffee beans. Thereto, the controller controls the first motor 17 to drive the shaft in clockwise direction according to a top view. Accordingly, the first/second impellor starts rotating in the clockwise direction. In case of the first impellor 10, the drive shaft 18 rotates the drive bush 1530 and the nut thereon 1540. The protrusions 1542 (see FIG. 5A) of the nut 1540, which are engaged with the corresponding slots in the wall of the recess of the hollow hub portion 1511 cause the hollow hub portion 1511 and thereby also the bottom 1577 and the vanes 13 connected thereto to rotate. The ratchet connection between the bottom 1577 of the impellor 10 and the closure plate 1633 of the first cartridge allows the rotation of the impellor in the clockwise direction. The edge 1546, which is positioned in one of the corresponding slots 1536 in the screw thread 1534 of the drive bush 1530, impedes the rotation of the nut 1540 with respect to the drive bush 1530. In this example in the first step, the impellor 10 is driven longer than is required for completely filling or at least substantially completely filling the metering chamber (in this application at least substantially means for example for more than 90%). This is possible, because of the use of the flexible vanes 13. The metering chamber is arranged for receiving a portion of coffee beans corresponding to a dosed amount of coffee beans which is preferably necessary for preparing a single serving of coffee beverage, such as a single cup coffee comprising 80-160 ml of coffee. A filled metering chamber comprises in this example one dose of coffee beans. One dose of coffee beans comprises 5-11, preferably 6-8 grams of coffee beans.

Then, in a second step the control device 40 controls the motor 17 to rotate the drive shaft 18 180° or a little more in the opposite counter clockwise direction. The ratchet connection 1515, 1630 (see FIGS. 5B/9A) will cause the impellor 10 to stay in its position. The rotation force of the drive shaft 18 will cause the drive bush 1530 to rotate, too. Since the nut 1540 is connected by means of a protrusion 1542 and corresponding slot 1517 to the impellor 10, which is stationary, the rotation of the drive bush 1530 will cause the nut 1540 to move down with respect to the drive bush 1530 along the screw thread 1532 until its edge 1546 snaps into one of the corresponding interruptions 1536, again. This is because the resistance of moving the nut 1540 along the screw thread 1532 is smaller than the resistance of moving the impellor 10 in counter clockwise direction with respect to the closure plate due to the ratchet connection 1515, 1630. In case of the counter clock wise rotation is larger than 180°, the edge 1546 may be positioned under a little tension somewhere along the "ramp" of interruption 1536. Wit a small clockwise rotation, the edge 1546 may be brought in a tensionless position in the interruption 1536.

Then, in a third step, the controller activates the grinder by activating the second motor 101. The grinder is activated longer than is required for emptying the metering chamber and for grinding all the coffee beans which were collected in the metering chamber during the first step. In this example in the third step the grinder is activated longer than required for completely emptying or at least substantially completely emptying the metering chamber (in this application at least substantially completely emptying means for example for more than 90%).

Finally, in a fourth step which follows after that the second step is completed the controller controls the brewing device to brew coffee based on the grinded coffee and on heated water.

Figure 5G:
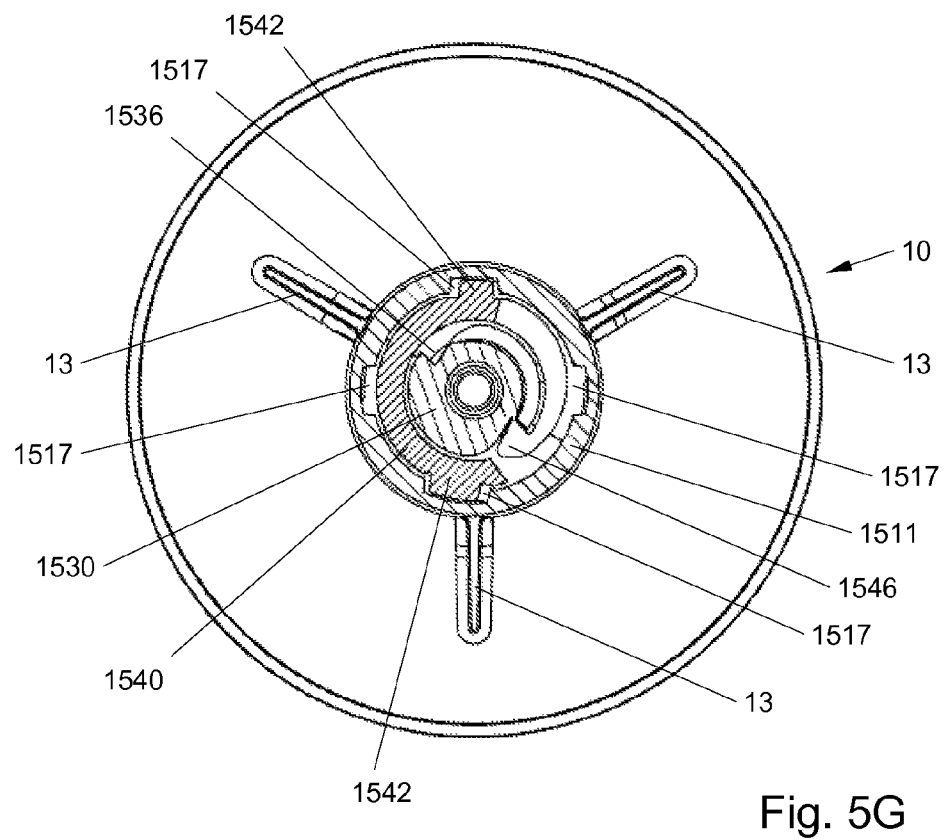
FIG. 5G shows a cross sectional top view with the drive means in their initial position.
Figure 5H:
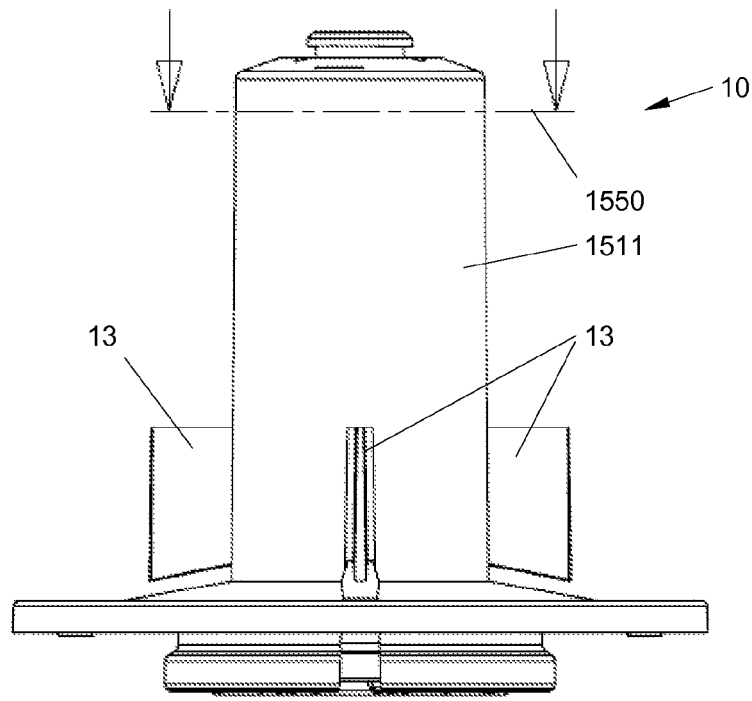
FIG. 5H shows a cross sectional front view with the drive means in their initial position.
Figure 5I:
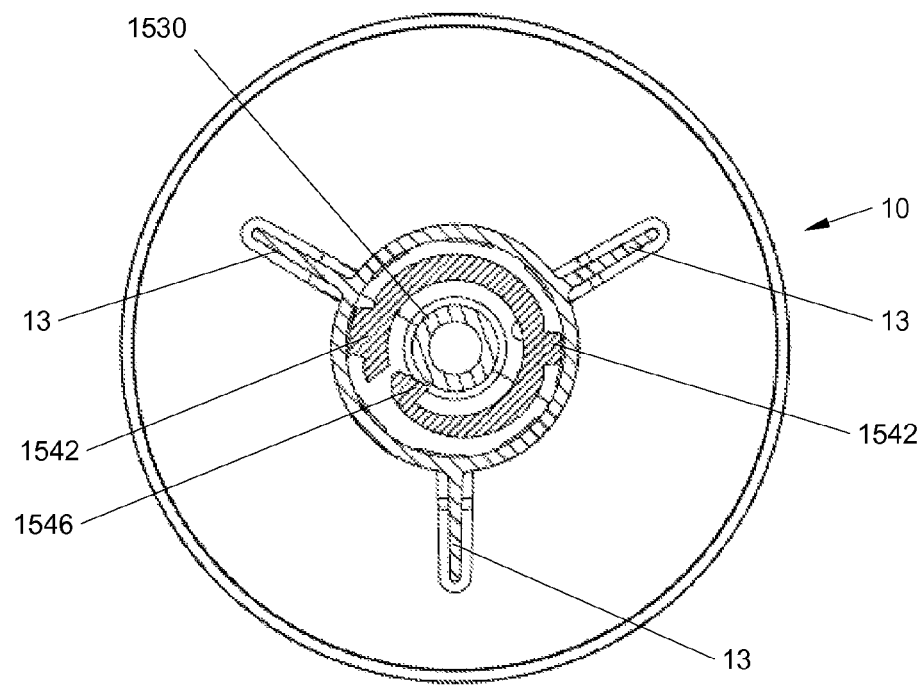
FIG. 5I shows a cross sectional top view with the drive means in their final position.
Figure 5J:
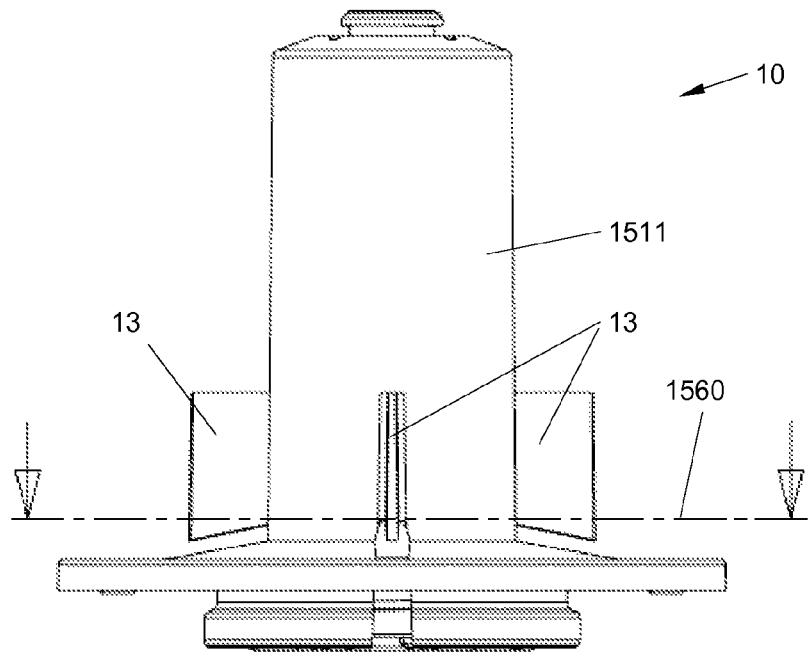
FIG. 5J shows a cross sectional front view with the drive means in their final position.

When the cartridge of the first type is used for the first time the nut 1540 is in its initial position shown in FIGS. 5G-5H, at the top end of the drive bush 1530. As the 180° counter clockwise rotation is executed after each complete filling of the metering chamber, as the coffee beans of the first cartridge are used, the nut 1540 climbs down "half a revolution" along the screw thread 1532 of the drive bush 1530. After a first predetermined number of counter clockwise revolutions, the nut leaves the screw thread 1532 and falls to a position next to the part 1534 at the lower end of the drive bush 1530, which is not covered with the screw thread 1532, as shown in 5D-5F. As a result, the protrusions 1542 of the nut 1540 disengage from the corresponding slots of the wall 1513 of the recess, because the vertical extension of these slots corresponds to the vertical extension of the screw thread 1532, i.e. the slots do not extend to the part of the wall 1513 opposite to the part 1534 not covered with screw thread. This is shown in FIGS. 5I-5J. Because of this disengagement, rotation of the drive shaft 18/drive bush 1530 does not result in a corresponding rotation of the impellor. Consequently, the first cartridge 10 cannot be used any more with the coffee brewing apparatus and should be replaced by a new one.

Preferably, the size of the cartridge and the length of the screw thread are chosen such that the first predetermined number of revolutions of the drive shaft resulting in disabling the driving of the impellor is larger than the number of revolutions corresponding to the number of servings of coffee possible with the full cartridge.

When a cartridge of the second type is used, the controller works exactly in the same way, i.e. after filling the metering chamber completely, it controls the motor so that the drive shaft 18 makes a 180° counter clockwise rotation. However, this small counter clockwise rotation does not adversely affect the ability of the second impellor 11 of transporting the coffee beans to the exit opening of the second cartridge. The second impellor simply makes a corresponding rotation in the counterclockwise direction but without any coffee beans in the cartridge this rotation has no relevant effect. The ratchet connection 1515,1630 (see FIGS. 7B and 9A) between the second impellor 11 and the closure plate 1633 does not impede this counter clockwise rotation.

Figure 12A:
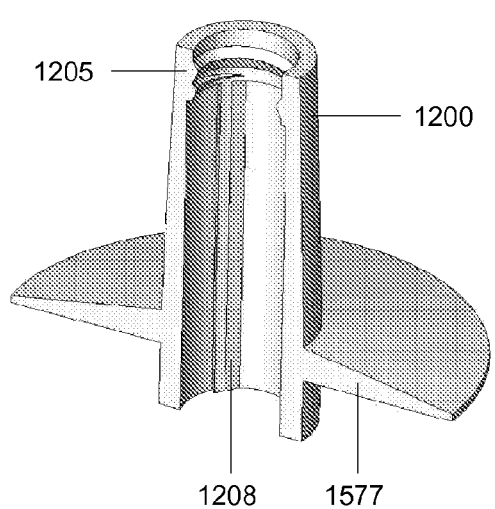
FIGS. 12A-12C show the drive means and impellor of a coffee bean packaging cartridge of the first type according to a further embodiment of the invention.
Figure 12B:
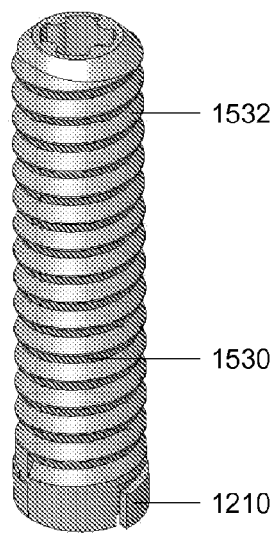
Figure 12C:
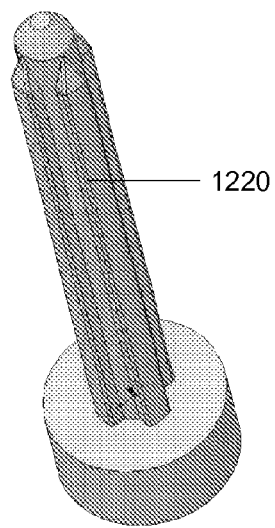
Figure 12D:
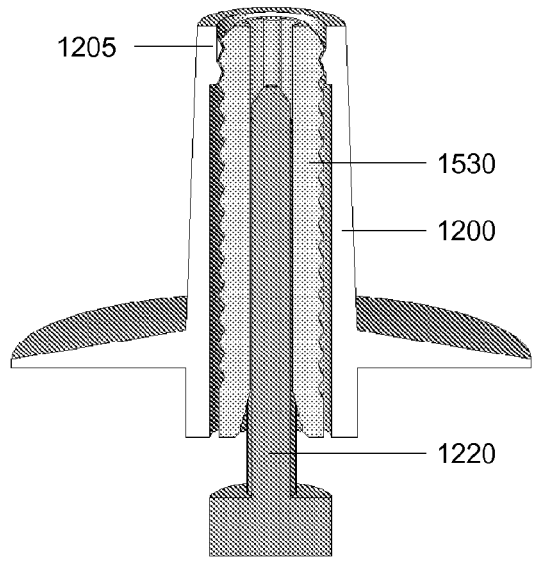
FIG. 12D is a cross-sectional detail of the elements of FIGS. 12A-12C mounted together.

With reference to FIGS. 12A-12D and 13A-13D, the impellor and drive means will be described of a cartridge of the first type according to a further embodiment. According to this further embodiment the coffee brewing apparatus should have a longer drive shaft 1220 (see FIG. 12C), which is inserted in the hollow interior of a drive bush 1530 (see FIG. 12B). The drive bush has two snap fingers 1210 near its bottom. The drive bush 1530 at its turn is inserted in the interior of a hollow hub portion 1200 of an impellor. The interior wall of this hollow hub portion comprises a coil thread 1205 and two edges 1208 (see FIG. 12A, only one shown). In FIG. 12D the three elements are shown together in their initial position.

FIG. 13A shows a bottom view of the drive shaft, drive bush and impellor for the case that the drive shaft rotates clockwise. The snap fingers 1210 of the drive bush lock with the edge 1208 of the interior wall of the hollow hub portion, so that the impellor rotates.

FIG. 13B shows of the drive shaft, drive bush and impellor for the case that the drive shaft rotates counter clockwise for a little over 180°. Due to the ratchet connection between the impellor and the closure member 1633, described herein above, the impellor stays in its position. The snap fingers 1210 bend and lock in their subsequent position. The drive bush 1530 moves up half a revolution or pitch due to its screw thread 1532, which engages with the coil thread 1205 of the hub part of the impellor. By repeating this process after each coffee dosing the drive bush works its way up in the hub part, as shown in FIG. 13C. After the first predetermined number of revolutions, the drive bush reaches its final position, as shown in FIG. 13D. In this position, the drive shaft 1220 does not reach the drive bush 1530 and the impellor will not rotate upon rotation of the drive shaft 1220.

Figure 14A:
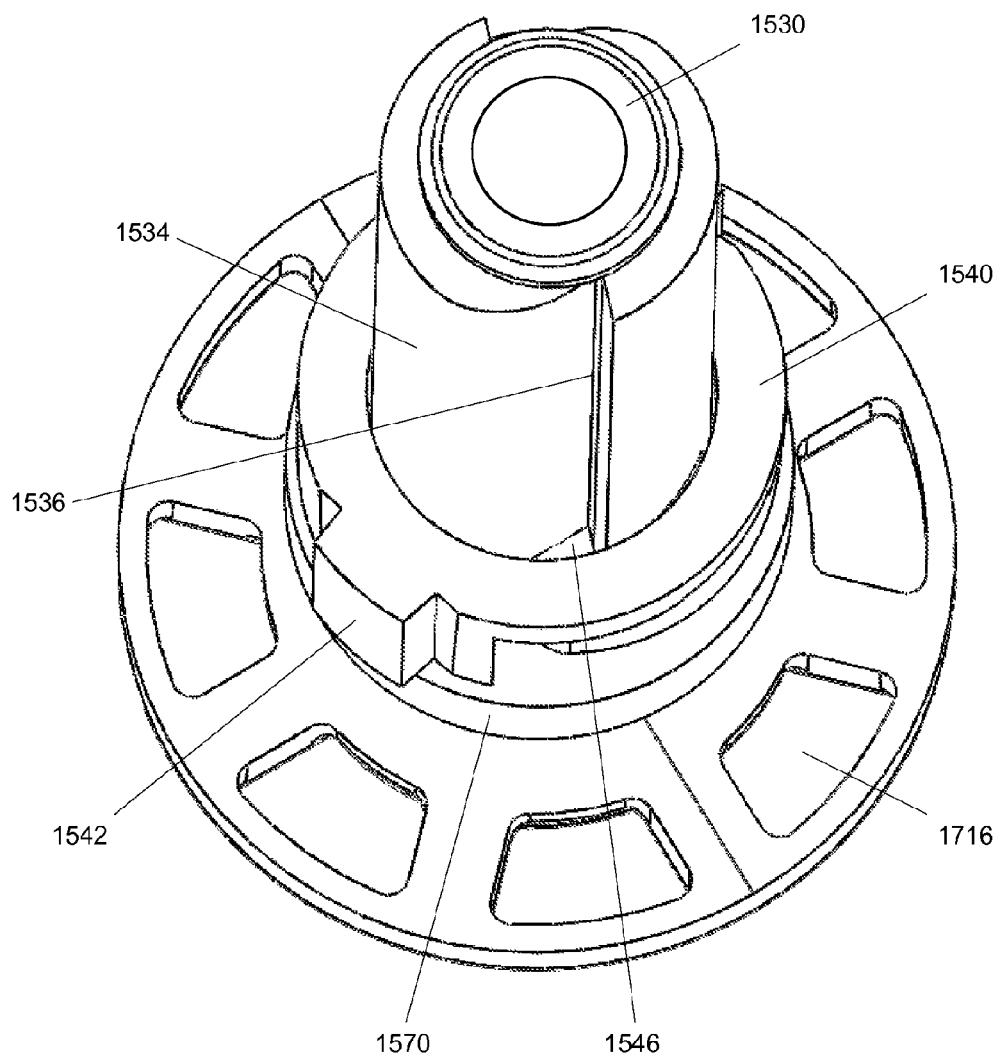
FIGS. 14A-14B show the drive means and impellor of a coffee bean cartridge of the second type according to a further embodiment of the invention.
Figure 14B:
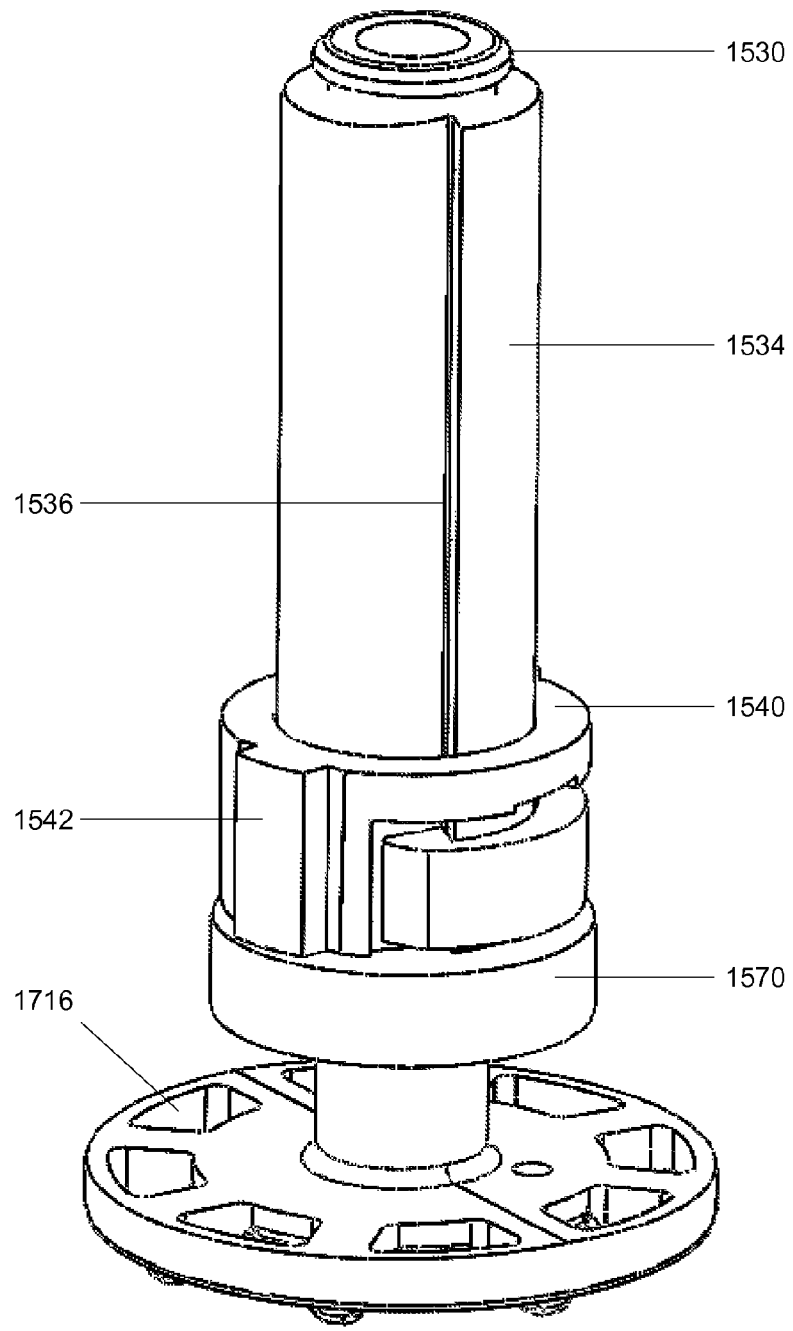

Now with reference to FIGS. 14A-14B, a further embodiment will be described of drive mans for an impellor used in a cartridge of the second type, i.e. without anti-refill mechanism. The impellor used in this case is the impellor 10 used for the cartridge with anti-refill described herein above with reference to FIGS. 5A-5J. However, the drive means differ in the following aspects. The drive bush 1530 is not covered with screw thread at all and the nut 1540 does not have screw thread at its interior side. As a result, the nut 1540 may move freely with respect to the drive bush 1530 in a vertical direction but due to the gravity it will be positioned as shown in FIGS. 14A-14B on the top of a flange 1570, which is part of the drive bush 1530. In this position, and also in all other possible positions of the nut 1540, the nut is engaged with the hollow hub portion 1511 by means of its protrusions 1542. Consequently, the rotation of the drive shaft 18 in clockwise direction results in the impellor 10 being rotated. When the drive shaft is rotated half a turn in the counter clock wise direction, nut 1540 rotates with respect to the drive bush 1530. However, this rotation is functionless, because the edge 1546 simply moves from one to the other slot 1536 of the drive bush remaining in a position for driving the impellor in case of subsequent clockwise rotation.

It is thus believed that the operation and construction of the present invention will be apparent from the foregoing description. The invention is not limited to any embodiment herein described and, within the purview of the skilled person; modifications are possible which should be considered within the scope of the appended claims. For example, the transportation means of the second cartridge for transporting the coffee beans from the container to the metering chamber may be implemented as passive means not driven by a motor, for example by means of a downwardly extending bottom wall for transporting the coffee beans towards the exit opening and into the metering chamber under the influence of gravity only. A special means may in that case be required to close the inlet opening of the metering chamber once it is filled with coffee beans. Furthermore, instead of disabling the driving of the impellor by disengagement of a mechanical connection the system may be brought into a motor stall condition. One option thereto is the engagement of an edge of the rotatable drive means in a corresponding slot of the funnel 8, after the first predetermined revolutions of the drive shaft.

Similarly all kinematic inversions are considered inherently disclosed and to be within the scope of the present invention. The term "comprising" when used in this description or the appended claims should not be construed in an exclusive or exhaustive sense but rather in an inclusive sense. Expressions such as: "means for . . . " should be read as: "component configured for . . . " or "member constructed to . . . " and should be construed to include equivalents for the structures disclosed. The use of expressions like: "critical", "preferred", "especially preferred" etc. is not intended to limit the invention. Features which are not specifically or explicitly described or claimed may be additionally included in the structure according to the present invention without deviating from its scope.

The invention claimed is:

1. A coffee beverage system, including a first coffee bean packaging cartridge and a coffee brewing apparatus wherein the first coffee bean packaging cartridge can be removable connected to the coffee brewing apparatus, the first coffee bean packaging cartridge being arranged for holding and supplying multiple servings of coffee beans, the first coffee beans packaging cartridge including:
   a container comprising an interior volume and at least one exit opening defining a coffee bean outlet, the interior volume holding coffee beans;
   transportation means adapted for enabling transportation of the coffee beans from the interior volume towards the exit opening of the first cartridge;
   wherein the coffee apparatus comprises an entrance opening for receiving coffee beans which are transported with the aid of the transportation means towards the exit opening of the first cartridge, a grinder for grinding coffee beans which have entered the coffee apparatus via the entrance opening and a brewing device for brewing coffee on the basis of grinded coffee obtained by means of the grinder, wherein the transportation means of the first cartridge comprise a part which is movable relative to a main body of the first cartridge for transporting the coffee beans towards the exit opening of the first cartridge upon driving of said transportation means, wherein the coffee brewing apparatus includes a motor and a vertically extending drive shaft wherein said drive shaft can be releasable connected with the transportation means of the first cartridge for driving and thereby moving the transportation means of the first cartridge upon rotation of the drive shaft by means of the motor means for transporting the coffee beans towards the exit opening of the first cartridge, wherein the first cartridge is arranged such that, if the drive shaft is connected with the transportation means, after a first predetermined number of revolutions of the drive shaft the transportation means of the first cartridge is automatically disabled for transporting the coffee beans towards the exit opening; and
   wherein the system is further provided with a second coffee bean cartridge which can also be removable connected to the coffee brewing apparatus, the second coffee bean cartridge being arranged for being filled with and holding and supplying multiple servings of coffee beans, the second coffee beans cartridge including:
      a container comprising an interior volume and at least one exit opening defining a coffee bean outlet, the interior volume being arranged for holding coffee beans;
      transportation means adapted for enabling transportation of the coffee beans from the interior volume towards the exit opening of the second cartridge if the transportation means of said second cartridge is releasable connected to said drive shaft;
      wherein the second cartridge is adapted to the coffee apparatus so that, if the second cartridge is connected to the coffee apparatus, coffee beans which are transported with the aid of the transportation means of the second cartridge towards the exit opening of the second cartridge can be received by the coffee apparatus via the entrance opening for preparing coffee and wherein the second cartridge is arranged such that the transportation means of the second cartridge will not be disabled upon a predetermined number of revolutions of the drive shaft or will only be disabled after a second predetermined number of revolutions of the drive shaft wherein the second predetermined number of revolutions is greater than the first predetermined number of revolutions.

2. The system according to claim 1, wherein the second cartridge is designed to be refillable.

3. The system according to claim 1, wherein the first cartridge is designed not to be refillable.

4. The system according to claim 1, wherein the first cartridge is arranged such that, if the drive shaft is connected with the transportation means, after a first predetermined number of revolutions of the drive shaft in a direction other than, or other than used for driving the transportations means of the first cartridge the transportation means of the first cartridge is automatically disabled for transporting the coffee beans towards the exit opening.

5. The system according to claim 1, wherein the first cartridge is arranged such that, if the drive shaft is connected with the transportation means after a first predetermined number of revolutions of the drive shaft for driving the transportations means of the first cartridge the transportation means of the first cartridge is automatically disabled for transporting the coffee beans towards the exit opening.

6. The system according to claim 1, wherein the system is arranged for executing the automatic disabling of the transportation means of the first cartridge for transporting the coffee beans towards the exit opening by means of bringing it into a motor stall condition.

7. The system according to claim 1, wherein the system is arranged for executing the automatic disabling of the transportation means of the first cartridge for transporting the coffee beans towards the exit opening by means of disengagement of a mechanical connection, so that the rotation of the drive shaft does not result in driving the transmission means or a part of the transmission means.

8. The system according to claim 1, wherein the movable part of the transportation means of the first cartridge includes a disk element, which rotates upon rotation of the drive shaft.

9. The system according to claim 8, wherein the disk element is an impellor including a bottom and a plurality of vanes.

10. The system according to claim 8, wherein the disk element includes a recess wherein the disk element rotates upon rotation of the drive shaft in a direction for driving the transportations means due to an engagement of drive means with the recess.

11. The system according to claim 10, wherein the first cartridge is arranged such that, if the drive shaft is connected with the transportation means, after a first predetermined number of revolutions of the drive shaft in a direction other than, or other than used for driving the transportations means of the first cartridge the transportation means of the first cartridge is automatically disabled for transporting the coffee beans towards the exit opening, and wherein the first cartridge comprise means for causing the disk element to stay in its position upon rotation of the drive shaft in the direction other than, or other than used for driving the transportations means.

12. The system according to claim 11, wherein the first cartridge comprises means for the displacement of an element of the drive means in the recess upon rotation of the drive shaft in the direction other than, or other than used for driving the transportations means.

13. The system according to claim 12, wherein the means for displacement is arranged such that after a first predetermined number of revolutions of the drive shaft in the direction other than, or other than used for driving the transportations means the element of the drive means in the recess reaches a position corresponding to a motor stall condition or a position resulting in the disengagement of the mechanical connection.

14. The system according to claim 12, wherein the means for displacement are configured for displacing the element through the recess in one direction and impeding the displacement of the element in the other opposite direction.

15. The system according to claim 10, wherein the drive means comprises the drive shaft and a drive bush, mountable on the drive shaft.

16. The system according to claim 15, wherein the drive means comprises a nut mountable on the drive bush.

17. The system according to claim 16, wherein the engagement of the drive means and the recess is by means of an engagement of the nut and a wall of the recess.

18. The system according to claim 17, wherein the engagement of the drive means and the recess is by means of one or more protrusions engaging with one or more corresponding slots.

19. The system according to claim 16, wherein the first cartridge comprise means for causing the disk element to stay in its position upon rotation of the drive shaft in the direction other than, or other than used for driving the transportations means, wherein the first cartridge comprises means for the displacement of an element of the drive means in the recess upon rotation of the drive shaft in the direction other than, or other than used for driving the transportations means, and wherein the element of the drive means that, in use, is displaced in the recess is the nut and in that the displacement means is a screw thread covering a part of the surface of the drive bush, wherein revolutions of the drive shaft result in a movement of the nut over the part of the surface of the drive bush covered with screw thread and wherein after the first predetermined number of revolutions of the drive shaft the nut leaves the part of the surface of the drive bush covered with the screw thread and disengages from the wall of the recess.

20. The system according to claim 19, wherein the one or more slots or one or more protrusions vertically extend over the surface of the wall of the recess corresponding to the surface of the drive bush covered with screw thread, wherein when the nut leaves the part of the surface of the drive bush covered with the screw thread, the one or more protrusions disengage from the corresponding slot or slots.

21. The system according to claim 18, wherein the first cartridge comprise means for causing the disk element to stay in its position upon rotation of the drive shaft in the direction other than, or other than used for driving the transportations means, wherein the first cartridge comprises means for the displacement of an element of the drive means in the recess upon rotation of the drive shaft in the direction other than, or other than used for driving the transportations means, wherein the means for displacement are configured for displacing the element through the recess in one direction and impeding the displacement of the element in the other opposite direction, and wherein the means for displacement comprises one or more vertically extending interruptions of the screw thread and an edge at the interior of the nut shaped for enabling the motion of the nut along the screw thread in the one direction and inhibiting the motion of the nut along the screw thread in the other opposite direction.

22. The system according to claim 11, wherein the means for causing the disk element to stay in its position upon rotation of the drive shaft in the direction other than, or other than used for driving the transportation means is a ratchet connection between the disk element and an upper surface of the coffee brewing apparatus.

23. The system according to claim 15, wherein the engagement of the drive means and the recess is by means of an engagement of the drive bush and the wall of the recess.

24. The system according to claim 23, wherein the engagement of the drive means and the recess is by means of one or more snap fingers with one or more corresponding slots, wherein the snap fingers and the corresponding slots furthermore work as means for causing the disk element to stay in its position upon rotation of the drive shaft in the direction other than, or other than used for driving the transportations means.

25. The system according to claim 23, wherein the first cartridge comprise means for causing the disk element to stay in its position upon rotation of the drive shaft in the direction other than, or other than used for driving the transportations means, wherein the first cartridge comprises means for the displacement of an element of the drive means in the recess upon rotation of the drive shaft in the direction other than, or other than used for driving the transportations means, wherein the means for displacement are configured for displacing the element through the recess in one direction and impeding the displacement of the element in the other opposite direction, and wherein the element of the drive means that, in use, is displaced in the recess is the drive bush and in that the displacement means is a screw thread covering a part of the surface of the drive bush engaging with a corresponding coil thread in the wall of the recess of the disk element, wherein revolutions of the drive shaft in the direction other than, or other than used for driving the transportation means result in the drive bush going upwards with respect to the disk element and after the first predetermined number of revolutions of the drive shaft in the direction other than, or other than used for driving the transportation the drive bush disengages from the drive shaft.

26. The system according to claim 1, wherein the transportation means of the first cartridge comprise a downwardly extending bottom wall such as a funnel of the container for transporting the coffee beans towards the exit opening of the first cartridge under the influence of gravity.

27. The system according to claim 1, wherein the transportation means of the second cartridge comprises a part which is movable relative to a main body of the second cartridge for transporting the coffee beans towards the exit opening of the second cartridge upon driving of said transportation means, and in that the transportation means are releasable connectable with the vertically extending drive shaft of the coffee brewing apparatus, wherein upon rotation of the drive shaft by means of the motor the transportation means of the cartridge are driven and thereby moved for transporting the coffee beans towards the exit opening of the second cartridge.

28. The system according to claim 27, wherein the movable part of the transportation means of the second cartridge includes a disk element, which rotates upon rotation of the drive shaft.

29. The system according to claim 28, wherein the disk element is an impellor including a bottom and a plurality of vanes.

30. The system according to claim 28, wherein disk element includes a recess wherein the disk element rotates upon rotation of the drive shaft due to an engagement of drive means with the recess.

31. The system according to claim 27, wherein the first cartridge is arranged such that, if the drive shaft is connected with the transportation means, after a first predetermined number of revolutions of the drive shaft in a direction other than, or other than used for driving the transportations means of the first cartridge the transportation means of the first cartridge is automatically disabled for transporting the coffee beans towards the exit opening, and wherein the second cartridge is arranged such that, if the drive shaft is connected with the transportation means, the transportation means will not be disabled upon a predetermined number of revolutions of the drive shaft in a direction other than, or other than used for driving the transportations means of the second cartridge or will only be disabled after a second predetermined number of revolutions of the drive shaft wherein the second predetermined number of revolutions is greater than the first predetermined number of revolutions.

32. The system according to claim 1, wherein the transportation means of the second cartridge comprise a downwardly extending bottom wall such as a funnel of the container for transporting the coffee beans towards the exit opening of the second cartridge under the influence of gravity.

33. The system according to claim 32, wherein the transportation means of the second cartridge comprise the funnel of the container and the part which is movable relative to the main body of the second cartridge.

34. The system according to claim 27, wherein the transportation means of the second cartridge comprise a downwardly extending bottom wall for transporting the coffee beans towards the exit opening of the second cartridge under the influence of gravity only.

35. The system according to claim 1, wherein the system is further provided with a metering chamber for receiving coffee beans which are transported with the aid of the transportation means into the metering chamber.

36. The system according to claim 35, wherein the metering chamber is divided in a first chamber portion which is part of the first or second cartridge and a second chamber portion which is part of the coffee brewing apparatus wherein the second chamber portion comprises a bottom portion which forms a part of the grinder, said bottom portion being arranged in the coffee brewing apparatus for rotating around a first axis extending in a vertical direction wherein the system is arranged such that upon activation of the grinder the bottom portion is rotating around the vertical axis for transporting the coffee beans from the metering chamber into the grinder and for grinding the coffee beans.

37. The system according to claim 36, wherein the bottom portion has a conical shape such that the bottom portion extends downwardly in a direction extending perpendicular to and away from the first vertical axis and in that the first chamber portion comprises the exit opening of the first or second cartridge and the second chamber portion comprises the entrance opening.

38. The system according to claim 37, wherein that the first chamber portion is located above the second chamber portion wherein the exit opening of the first or second cartridge extends above the entrance opening.

39. The system according to claim 35, wherein the metering chamber is arranged for receiving a portion of coffee beans corresponding to a dosed amount of coffee beans which is preferably necessary for preparing a single serving of coffee beverage, such as a single cup coffee comprising 80-160 ml of coffee.

40. The system according to claim 1, wherein the first and/or the second cartridge comprises closing means for closing the exit opening when the cartridge is not connected to the coffee brewing apparatus.

41. The system according to claim 40, wherein the closing means are configured for opening the exit opening when the cartridge is connected to the coffee brewing apparatus.

42. The system according to claim 40, wherein the closing means comprises a closure member at the bottom side of the container comprising the exit opening and a rotatable closing disk having an opening.

43. The system according to claim 42, wherein the closing means are configured for opening the exit opening when the cartridge is connected to the coffee brewing apparatus, and wherein in order to connect the cartridge to the coffee brewing apparatus the opening of the rotatable closing disk is brought in a position aligned with the exit opening.

44. The system according to claim 43, wherein the closure member comprises a pair of fletching arms and the closure disk comprises a detent, which in the closed position is caught behind the fletching arms.

45. The system according to claim 1, wherein the exit opening of the first and/or second cartridge is associated with a removable sealing element sealing the interior volume prior to activation of the cartridge wherein preferably said sealing element prevents gasses to escape from the cartridge.

46. The system according to claim 45, wherein it further includes means for disrupting and displacing the sealing element.

47. The system according to claim 45, wherein in the sealing element is a sealing membrane.

48. The system according to claim 46, wherein the means for disrupting and displacing is a pull tab.

49. The system according to claim 1, wherein the coffee brewing apparatus comprises connection means for the removable connection to the coffee bean packaging cartridge, the connection means comprising a recess at an upper side of the coffee brewing apparatus, the recess being surrounded by a side wall and being configured for receiving a corresponding part protruding from a lower side of the first and/or second cartridge.

50. The system according to claim 49, wherein the side wall protrudes from the upper side of the coffee brewing apparatus.

51. The system according to claim 49 wherein the side wall comprises openings for receiving bayonet elements of the first and/or second cartridge.

52. The system according to claim 51, wherein the first and/or second cartridge comprises the bayonet elements.

53. The system according to claim 51, wherein the first and/or second cartridge should be inserted into the recess such that the bayonet elements are inserted in the openings and then rotated in order to be connected to the coffee brewing apparatus, wherein the side wall comprises blocking elements for impeding a further rotation of the cartridge, when it has reached its final position.

54. The system according to claim 53, wherein the cartridge should be rotated approximately 50 degrees in order to reach its final position.

55. The system according to claim 49, wherein the recess comprises rotatable protruding edges at its center, which are fixed at the driving shaft wherein the transportation means of the first and/or second cartridge is provided with recesses for receiving the protruding edges such that upon rotation of the drive shaft the rotating protruding edges drive the transportation means.

56. The system according to claim 50, wherein the coffee brewing apparatus comprises a housing surrounding the protruding side wall.

57. The system according to claim 1, further comprising control means for rotating the vertically extending drive shaft with the motor means thereby driving and moving the transportation means for transporting the coffee beans towards the exit opening of the first and/or second cartridge;
grinding coffee beans which have entered the coffee apparatus via the entrance opening thereof; and
brewing coffee based on the grinded coffee and heated water heated by a heating device of the coffee brewing apparatus.

58. The system according to claim 57, further comprising a metering chamber for receiving coffee beans which are transported with the aid of the transportation means into the metering chamber, and wherein the control means are configured for rotating the vertically extending drive shaft with the motor means thereby driving and moving the transportation means of the first and/or second cartridge for filling the metering chamber and in that the control means is furthermore configured for rotating the drive shaft with the motor means in a direction other than, or other than used for driving the transportations means of the first and/or second cartridge, after the filling of the metering chamber.

59. The system according to claim 58, wherein the control means are configured such that, in use, in a first step the transportation means is driven for filling the metering chamber with coffee beans and that in a second step which follows after the completion of the first step the grinding device is activated for emptying the metering chamber and for grinding coffee beans which were collected in the metering chamber during the first step.

60. The system according to claim 59, wherein the control means is arranged such that, in use, in the first step the transportation means is driven longer than is required for filling the metering chamber with coffee beans and/or that in the second step the grinding device is activated longer than is required for emptying or at least substantially completely emptying the metering chamber and for grinding all the coffee beans which were collected in the metering chamber during the first step.

61. The system according to claim 1, wherein the first predetermined number of revolutions of the drive shaft resulting in disabling the transportation means is larger than the number of revolutions corresponding to the number of servings of coffee possible with the full cartridge.

62. The coffee brewing apparatus for use in a system according to claim 39, wherein the first cartridge is arranged such that, if the drive shaft is connected with the transportation means, after a first predetermined number of revolutions of the drive shaft in a direction other than, or other than used for driving the transportations means of the first cartridge the transportation means of the first cartridge is automatically disabled for transporting the coffee beans towards the exit opening, and wherein the coffee apparatus comprises an entrance opening for receiving coffee beans which are transported with the aid of the transportation means towards the exit opening of the first cartridge, a grinder for grinding coffee beans which have entered the coffee apparatus via the entrance opening and a brewing device for brewing coffee on the basis of grinded coffee obtained by means of the grinder and wherein the coffee brewing apparatus is provided with a motor and a vertically extending drive shaft wherein said drive shaft is releasable connected with the transportation means of the first and/or second cartridge wherein the coffee brewing apparatus comprises control means, which are configured for rotating the vertically extending drive shaft with the motor means thereby driving and moving the transportation means of the first and/or second cartridge for filling the metering chamber and in that the control means is furthermore configured for rotating the drive shaft with the motor means in a direction other than, or other than used for driving the transportations means of the first and/or second cartridge, after the filling of the metering chamber.

* * * * *